United States Patent
Wan et al.

(10) Patent No.: US 8,531,557 B2
(45) Date of Patent: Sep. 10, 2013

(54) METHOD, APPARATUS AND SYSTEM FOR PERFORMING A ZOOM OPERATION

(75) Inventors: Ernest Yiu Cheong Wan, Carlingford (AU); Xin Yu Liu, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 13/094,540

(22) Filed: Apr. 26, 2011

(65) Prior Publication Data

US 2011/0267499 A1 Nov. 3, 2011

(30) Foreign Application Priority Data

Apr. 30, 2010 (AU) ................................ 2010201740

(51) Int. Cl.
*H04N 5/262* (2006.01)
*H04N 7/18* (2006.01)

(52) U.S. Cl.
USPC ........................................ 348/240.2; 348/143

(58) Field of Classification Search
USPC ................. 348/240.99, 240.1, 240.2, 240.3
See application file for complete search history.

(56) References Cited

U.S. PATENT DOCUMENTS

| 7,248,294 | B2 | 7/2007 | Slatter | |
|---|---|---|---|---|
| 7,471,827 | B2* | 12/2008 | Xie et al. | 382/173 |
| 2003/0025812 | A1* | 2/2003 | Slatter | 348/240.2 |
| 2006/0056056 | A1* | 3/2006 | Ahiska et al. | 359/690 |
| 2010/0033567 | A1* | 2/2010 | Gupta et al. | 348/143 |
| 2010/0296802 | A1* | 11/2010 | Davies | 396/77 |
| 2011/0149120 | A1* | 6/2011 | Kubota | 348/240.99 |
| 2012/0044347 | A1* | 2/2012 | Sugio | 348/135 |

OTHER PUBLICATIONS

Bagdanov, Andrew D., del Bimbo, Alberto, Nunziati, Walter, Pernici, Federico. "A reinforcement learning approach to active camera foveation". In VSSN '06: Proceedings of the 4th ACM international workshop on video surveillance and sensor networks, Santa Barbara, California.

* cited by examiner

*Primary Examiner* — Tuan Ho
*Assistant Examiner* — Shahbaz Nazrul
(74) *Attorney, Agent, or Firm* — Canon USA Inc IP Division

(57) ABSTRACT

A method of performing a zoom operation on a camera is disclosed, wherein, one or more regions of interest within a captured image of a scene are determined. Camera motion direction towards one of the regions of interest is determined. A target region of interest is determined based on the determined camera motion direction. The zoom operation is performed to the target region of interest.

18 Claims, 16 Drawing Sheets

METHOD, APPARATUS AND SYSTEM FOR PERFORMING A ZOOM OPERATION

BACKGROUND OF INVENTION

1. Field of the Invention

The present invention relates to video recording camera systems and, in particular, to a method, apparatus and system for performing a zoom-operation during video recording.

2. Description of Background Art

In recent years, video recording cameras have become common to home users. Although normal users are familiar with operating the zoom functionality on a camera, zoom functionality can be difficult to use in some situations. For example, a user may be holding a camera, and through the camera, looking at a scene with a number of people who are some distance apart from each other. The user may wish to zoom-in to one of the people in the scene, and zoom-out again. The user does this zoom-in and zoom-out action repeatedly in an un-planned manner. If a conventional digital camera is used, in such an example, the user must repeatedly push the zoom button each time he/she wishes to zoom-in or zoom-out. The repeated zooming is a tedious task, and often results in jittering and camera shake.

One known method of performing a zoom operation uses multiple cameras, amongst which, one is a master camera and at least one is a slave camera. The master camera detects regions of interest and then instructs the slave camera to zoom-in to one of the regions of interest.

One known camera is configured to determine if, when and how to zoom in on a subject in a scene. Such autonomous decision making may be based on knowledge stored within a camera database in terms of previous successful action in similar situations. However, the area where the camera is zooming into is determined by the camera itself, instead of being controlled by a user of the camera.

SUMMARY OF THE INVENTION

It is an object of the present invention to substantially overcome, or at least ameliorate, one or more disadvantages of existing arrangements.

According to one aspect of the present disclosure there is provided a method of performing a zoom operation on a camera. The method includes determining a plurality of regions of interest within a captured image of a scene; determining a camera motion direction; selecting a target region of interest from the determined plurality of regions of interest based on the determined camera motion direction; and initiating the zoom operation for the selected target region of interest in response to the camera motion before the target region of interest occupies a centre area of a new image captured by the camera.

According to another aspect of the present disclosure there is provided a method of performing a zoom operation on a camera. The method includes determining a plurality of regions of interest within a captured image of a scene; determining a camera motion direction; determining a speed of motion of the camera; selecting a target region of interest from the determined plurality of regions of interest based on the determined camera motion direction; determining a zoom speed based on the speed of camera motion and the distance from a current image frame to the target image frame; and initiating the zoom operation for the selected target region of interest in response to the camera motion before the target region of interest occupies a centre area of a new image captured by the camera.

According to still another aspect of the present disclosure there is provided a system for performing a zoom operation on a camera. The system includes a memory for storing data and a computer program; and a processor coupled to the memory for executing the computer program. The computer program includes instructions for determining a plurality of regions of interest within a captured image of a scene; determining camera motion direction; selecting a target region of interest from the determined plurality of regions of interest based on the determined camera motion direction; and initiating the zoom operation for the selected target region of interest in response to the camera motion before the target region of interest occupies a centre area of a new image captured by the camera.

According to still another aspect of the present disclosure there is provided a system for performing a zoom operation on a camera. The system includes a memory for storing data and a computer program; a processor coupled to the memory for executing the computer program. The computer program includes instructions for determining a plurality of regions of interest within a captured image of a scene; determining a camera motion direction towards one of the regions of interest; determining a speed of motion of the camera; selecting a target region of interest from the determined plurality of regions of interest based on the determined camera motion direction; determining a zoom speed based on the speed of camera motion and the distance from a current image frame to the target region of interest; and initiating the zoom operation for the selected target region of interest in response to the camera motion before the target region of interest occupies a centre area of a new image captured by the camera.

According to still another aspect of the present disclosure there is provided apparatus for performing a zoom operation on a camera. The apparatus comprising means for determining a plurality of regions of interest within a captured image of a scene; means for determining camera motion direction; means for selecting a target region of interest from the determined plurality of regions of interest based on the determined camera motion direction; and means for initiating the zoom operation for the selected target region of interest in response to the camera motion before the target region of interest occupies a centre area of a new image captured by the camera.

According to still another aspect of the present disclosure there is provided an apparatus for performing a zoom operation on a camera. The apparatus includes means for determining a plurality of regions of interest within a captured image of a scene; means for determining a camera motion direction; means for determining a speed of motion of the camera; means for selecting a target region of interest from the determined plurality of regions of interest based on the determined camera motion direction; means for determining a zoom speed based on the speed of camera motion and the distance from a current image frame to the target region of interest; and means for initiating the zoom operation for the selected target region of interest in response to the camera motion before the target region of interest occupies a centre area of a new image captured by the camera.

According to still another aspect of the present disclosure there is provided a computer readable medium having a computer program stored thereon, the computer program being configured for performing a zoom operation on a camera. The program includes code for determining a plurality of regions of interest within a captured image of a scene; code for determining camera motion direction towards one of the regions of interest; code for selecting a target region of interest from the determined plurality of regions of interest based on the determined camera motion direction; and code for initiating the zoom operation for the selected target region of interest in response to the camera motion before the target region of interest occupies a centre area of a new image captured by the camera.

According to still another aspect of the present disclosure there is provided a computer readable medium having a computer program stored thereon, the computer program being configured for performing a zoom operation on a camera. The program includes code for determining a plurality of regions of interest within a captured image of a scene; code for determining a camera motion direction towards one of the regions of interest; code for determining a speed of motion of the camera; code for selecting a target region of interest based on the determined camera motion direction; code for determining a zoom speed based on the speed of camera motion and the distance from a current image frame to the target region of interest; and code for initiating the zoom operation for the selected target region of interest in response to the camera motion before the target region of interest occupies a centre area of a new image captured by the camera.

Other aspects and features of the present invention are also disclosed in the specification below and will become apparent from the following description of exemplary embodiments with reference to the attached drawings.

BRIEF DESCRIPTION OF THE DRAWINGS

FIG. 10A is a diagram of a general camera system (or image capture system); while

DESCRIPTION OF THE EMBODIMENTS

Figure 1A:
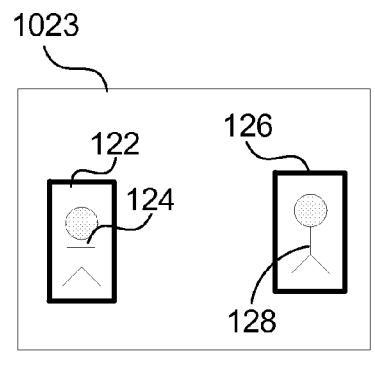
FIGS. 1a, 1b, 1c and 1d collectively show an example sequence of image frames representing a scene.

Where reference is made in any one or more of the accompanying drawings to steps and/or features, which have the same reference numerals, those steps and/or features have for the purposes of this description the same function(s) or operation(s), unless the contrary intention appears.

A method 200 (see FIG. 2) of performing a zoom operation on a camera system 1000 (see FIGS. 10A and 10B) during video recording, is described below with reference to FIGS. 1 to 9. A method 300 of ranking and grouping a region of interest (ROI) is also described. Further, a method 500 of performing a camera motion based incremental zoom operation, as executed in the method 200, is described. Still further, a method 600 of determining a zoom level and zoom speed will be described. The methods 300, 500 and 600 may be implemented within a hand-held video recording camera.

Figure 10A:
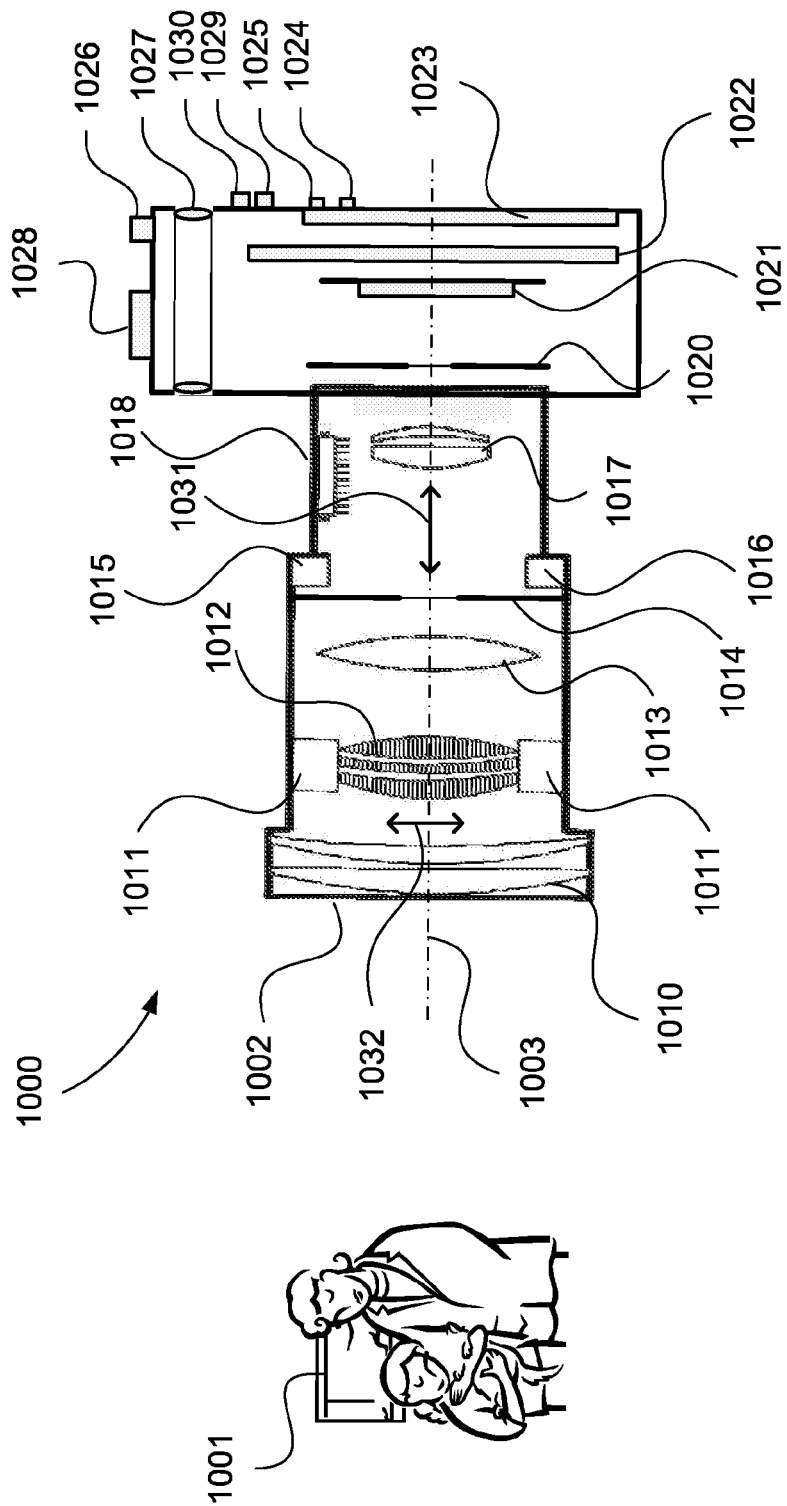

FIG. 10A is a cross-section diagram of an exemplary image capture system 1000, upon which the various arrangements described may be practiced. In the general case the image capture system 1000 is a digital still camera or a digital video recording camera (also referred to as a camcorder). As described below, the camera system 1000 (or camera) is a hand-held camera. However, the camera system 1000 may be a larger camera mounted on a tripod or the like.

As seen in FIG. 10A, the camera system 1000 comprises an optical system 1002 which receives light from a scene 1001 and forms an image on a sensor 1021. The sensor 1021 comprises a 2D array of pixel sensors which measure the intensity of the image formed on the sensor 1021 by the optical system 1002 as a function of position. The operation of the camera system 1000, including user interaction and all aspects of reading, processing and storing image data from the sensor 1021 is coordinated by a main controller 1022 which comprises a special purpose computer system. The main controller 1022 is described in detail below with reference to FIG. 10B. The user is able to communicate with the controller 1022 via a set of buttons including a shutter release button 1028, used to initiate focus and capture of image data.

The set of buttons also includes other general and special purpose buttons 1024, 1025, 1026 which may provide direct control over specific camera functions such as flash operation or support interaction with a graphical user interface presented on a display screen 1023. The display screen 1023 may also have a touch screen capability to further facilitate user interaction. Using the buttons and controls to the user can control or modify the behavior of the camera system 1000. The user may also control capture settings such as the priority of shutter speed or aperture size when achieving a required exposure level, or the area used for light metering, use of flash, ISO speed, options for automatic focusing and many other photographic control functions. Further, the user may control processing options such as color balance or compression quality. The display screen 1023 is typically also used to review the captured image or video data.

The display screen 1023 may also provide a live preview of the scene, particularly where the camera system 1000 is a still image camera, thereby providing an alternative to an optical viewfinder 1027 for composing prior to still image capture and during video capture. The buttons 1029 and 1030 allow users to control the lens controller 1018. In response to pushing button 1029, the camera system 1000 performs a zoom-in operation. Further, pushing button 1030, the camera system 1000 performs a zoom-out operation.

The optical system 1002 comprises an arrangement of lens groups 1010, 1012, 1013 and 1017 which can be moved relative to each other along a line 1031 parallel to an optical axis 1003 under control of a lens controller 1018 to achieve a range of magnification levels and focus distances for the image formed at the sensor 1021. The lens controller 1018 may also control a mechanism 1011 to vary the position, on any line 1032 in the plane perpendicular to the optical axis 1003, of a corrective lens group 1012, in response to input from one or more motion sensors 1015, 1016 or the controller 1022 so as to shift the position of the image formed by the optical system 1002 on the sensor 1021. The corrective optical element 1012 may be used to effect an optical image stabilization by correcting the image position on the sensor 1021 for small movements of the camera system 1000 such as those caused by hand-shake. The optical system 1002 may further comprise an adjustable aperture 1014 and a shutter mechanism 1020 for restricting the passage of light through the optical system. Although both the aperture and shutter are typically implemented as mechanical devices they may also be constructed using materials, such as liquid crystal, whose optical properties can be modified under the control of an electrical control signal. Such electro-optical devices have the advantage of allowing both shape and opacity of the aperture to be varied continuously under control of the controller 1022.

Figure 10B:
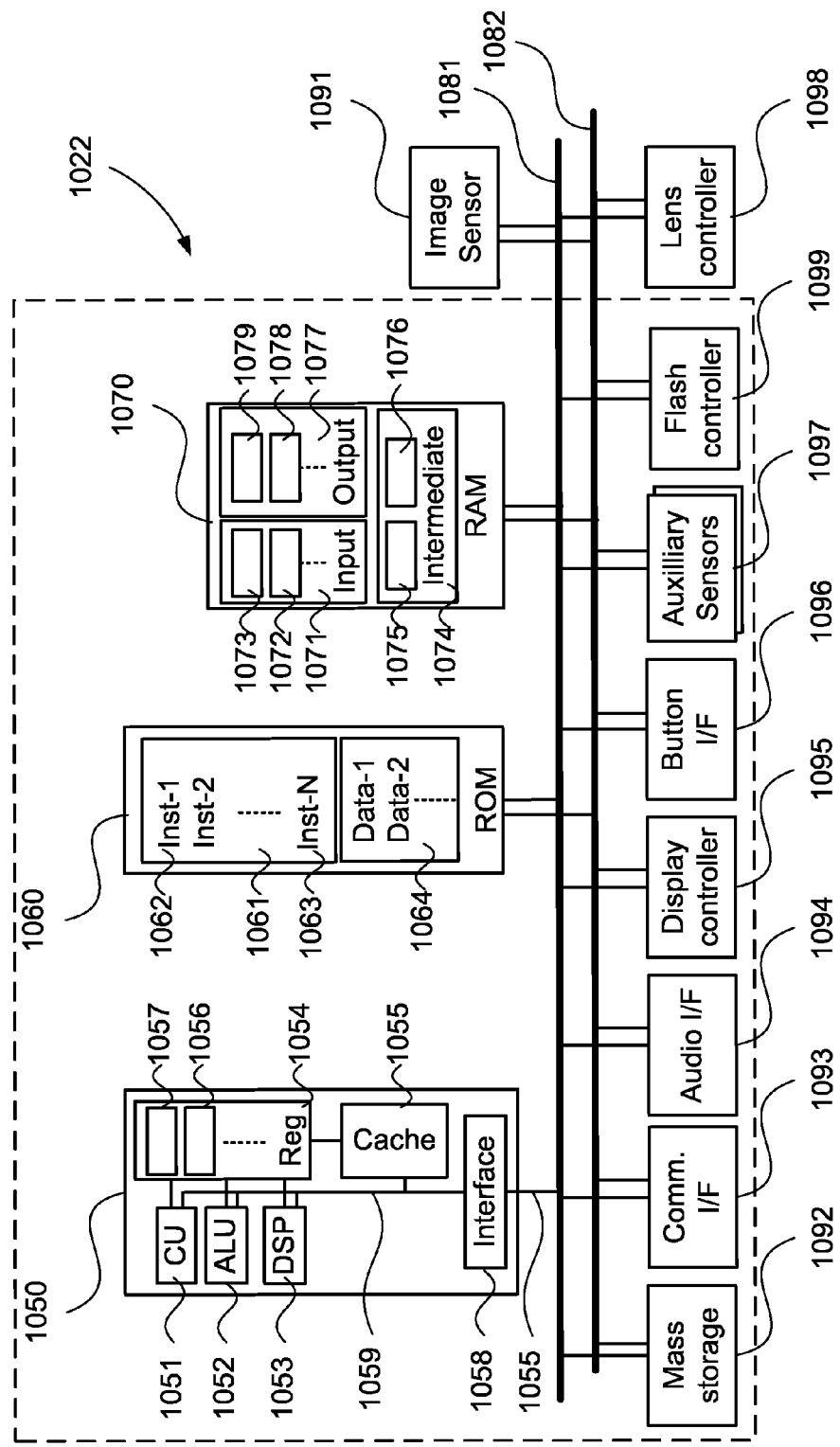
FIG. 10B is a block diagram for a controller used with the camera system of FIG. 10A.

FIG. 10B is a schematic block diagram for the controller 1022 of FIG. 10A where other components of the camera system 1000, which communicate with the controller 1022, are depicted as functional blocks. In particular, the image sensor 1091 and lens controller 1098 are depicted without reference to their physical organization or the image forming process and are treated only as devices which perform specific pre-defined tasks and to which data and control signals can be passed. FIG. 10B also shows a flash controller 1099 which is responsible for operation of a strobe light that can be used during image capture in low light conditions as auxiliary sensors 1097 which may form part of the camera system 1000. Auxiliary sensors may include orientation sensors that detect if the camera system 1000 is in a landscape or portrait orientation during image capture; motion sensors that detect movement of the camera system 1000; other sensors that detect the color of the ambient illumination or assist with autofocus and so on. Although these other sensors are depicted as part of the controller 1022, the other sensors may in some implementations be implemented as separate components within the camera system 1000.

The controller 1022 comprises a processing unit 1050 for executing program code. The processing unit 1050 is coupled to Read Only Memory (ROM) 1060 and Random Access Memory (RAM) 1070 as well as non-volatile mass data storage 1092. In addition, at least one communications interface 1093 is provided for communication with other electronic devices such as printers, displays and general purpose computers. Examples of communication interfaces include USB, IEEE1394, HDMI and Ethernet. The controller 1002 comprises an audio interface 1094. The audio interface 1094 comprises one or more microphones and speakers for capture and playback of digital audio data. A display controller 1095 and button interface 1096 are also provided to interface the controller to the physical display and controls present on the camera body. The components are interconnected by a data bus 1081 and control bus 1082.

In a capture mode, the controller 1022 operates to read data from the image sensor 1091 and audio interface 1094 and manipulate that data to form a digital representation (or image) of the scene. The digital representation may be stored in a non-volatile mass data storage 1092. Image data may be stored using a standard image file format such as JPEG or TIFF, particularly where the camera system 1000 is configured as a still image camera. The image data may be encoded using a proprietary raw data format that is designed for use with a complimentary software product that would provide conversion of the raw format data into a standard image file format. Such software may be executed on a general purpose computer. The sequences of images that comprise the captured video are stored using a standard format such DV, MPEG, H.264 where the camera system 1000 is configured as a video camera. Some of these formats are organized into files such as AVI or Quicktime™ referred to as container files, while other formats such as DV, which are commonly used with tape storage, are written as a data stream. The non-volatile mass data storage 1092 may also be used to store the image or video data captured by the camera system 1000. The non-volatile mass data storage 1092 has a large number of realizations including but not limited to removable flash memory such as a compact flash (CF) or secure digital (SD) card, memory stick, multimedia card, miniSD or microSD card; optical storage media such as writable CD, DVD or Blu-ray disk; or magnetic media such as magnetic tape or hard disk drive (HDD) including very small form-factor HDDs such as microdrives. The choice of mass storage depends on the capacity, speed, usability, power and physical size requirements of the particular camera system 1000.

In a playback or preview mode, the controller 1022 operates to read data from the mass storage 1092 and present that data using the display 1095 and audio interface 1094.

The processor 1050 is able to execute programs stored in one or both of the connected memories 1060 and 1070. When the camera system 1000 is initially powered up, system program code 1061, resident in ROM memory 1060, is executed. The system program code 1061 may be permanently stored in the ROM 1060 and is sometimes referred to as "firmware". Execution of the firmware by the processor 1050 fulfils various high level functions, including processor management, memory management, device management, storage management and user interface.

The processor 1050 includes a number of functional modules including a control unit (CU) 1051, an arithmetic logic unit (ALU) 1052, a digital signal processing engine (DSP) 1053 and a local or internal memory comprising a set of registers 1054. The set of registers 1054 typically contain atomic data elements 1056, 1057, along with internal buffer or cache memory 1055. One or more internal buses 1059 interconnect the functional modules. The processor 1050 typically comprises one or more interfaces 1058 for communicating with external devices via the system data 1081 and control 1082 buses using a connection 1055.

The system program 1061 includes a sequence of instructions 1062 though 1063 that may include conditional branch and loop instructions. The program 1061 may also include data which is used in execution of the program. The data may be stored as part of the instructions 1062 through 1063 or in a separate location 1064 within the ROM 1060 or RAM 1070.

In general, the processor 1050 is given a set of instructions which are executed therein. This set of instructions may be organized into blocks which perform specific tasks or handle specific events that occur in the camera system. Typically the system program will wait for events and subsequently execute the block of code associated with that event. This may involve setting into operation separate threads of execution running on independent processors in the camera system 1000 such as the lens controller 1098 that will subsequently execute in parallel with the program running on the processor. Events may be triggered in response to input from a user as detected by the button interface 1096. Events may also be triggered in response to other sensors and interfaces in the camera system 1000.

The execution of a set of the instructions may require numeric variables to be read and modified. Such numeric variables are stored in RAM 1070. The disclosed methods use input variables 1071, which are stored in known locations 1072, 1073 in the memory 1070. The input variables are processed to produce output variables 1077, which are stored in known locations 1078, 1079 in the memory 1070. Intermediate variables 1074 may be stored in additional memory locations in locations 1075, 1076 of the memory 1070. Alternatively, some intermediate variables may only exist in the registers 1054 of the processor 1050.

The execution of a sequence of instructions is achieved in the processor 1050 by repeated application of a fetch-execute cycle. The control unit 1051 of the processor maintains a register called the program counter which contains the address in memory 1060 of the next instruction to be executed. At the start of the fetch execute cycle, the contents of the memory address indexed by the program counter is loaded into the control unit. The instruction thus loaded controls the subsequent operation of the processor, causing for example, data to be loaded from memory into processor registers, the contents of a register to be arithmetically combined with the contents of another register, the contents of a register to be written to the location stored in another register and so on. At the end of the fetch execute cycle the program counter is updated to point to the next instruction in the program. Depending on the instruction just executed this may involve incrementing the address contained in the program counter or loading it with a new address in order to achieve a branch operation.

Each step or sub-process in the processes of flow charts are associated with one or more segments of the program 1061, and is performed by repeated execution of a fetch-execute cycle in the processor 1050 or similar programmatic operation of other independent processor blocks in the camera system.

FIG. 1*a*, FIG. 1*b*, FIG. 1*c* and FIG. 1*d* collectively show a sequence of frames representing a scene (e.g., 1001 as seen in FIG. 10A) captured live by the camera system 1000 and being displayed on the camera display screen 1023 in one implementation.

As seen in FIGS. 1*a* to 1*d*, time indicators labeled T1 130, T2 150, T3 170 and T4 190 represent four different points in time. As also seen in FIGS. 1*a* to 1*d*, the scene comprises objects 124 and 128. In particular, FIGS. 1*a* to 1*d* show the object 124 displayed on the display screen 1023 at different points in time. Further, FIGS. 1*a* to 1*d* show the object 128 displayed on the display screen 1023 at different points in time. Bounding boxes 122 and 126 are also shown displayed on the display screen 1023 at different points in time.

At time T1 130, the display screen 1023 shows the objects 124 and 128 of the scene during video capture. The objects 124 and 128 have been identified by the camera system 1000 as regions of interest (ROIs) within the scene and are highlighted by the bounding boxes 122, 126, as seen in FIG. 1*a*.

From T1 130 to T2 150, the camera system 1000 is panned (e.g., by a user of the camera system 1000) horizontally towards the object 128 displayed on the right hand side of the display screen 1023. While the camera system 1000 is being panned, the camera system 1000 is configured to automatically zoom-in on the scene. In particular, the camera system 1000 automatically controls lens controller 1018 which moves one or more of the lens groups 1010, 1012, 1013 and 1017 to achieve a desired zoom level without a user pushing zoom buttons 1029, 1030. At T2 150, the display screen 1023 shows a more zoomed-in view of the scene comprising the objects 124 and 128.

Figure 1B:
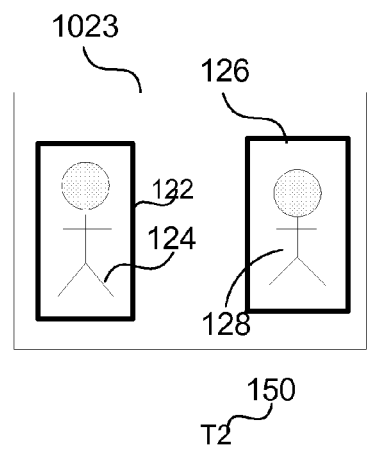
Figure 1C:
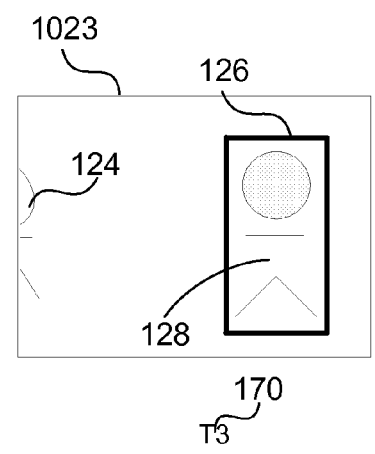
Figure 1D:
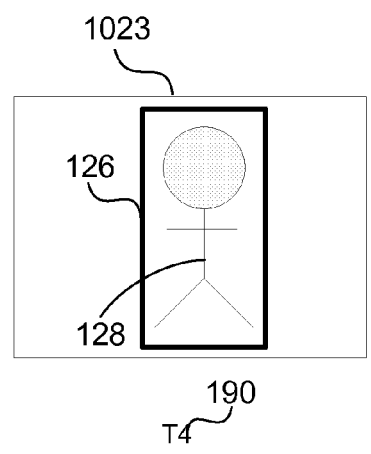

FIG. 1*b* shows the objects 124 and 128 of the scene at time T2 150 where the objects 124 and 128 are shown enlarged compared to FIG. 1*a*. FIG. 1*b* also shows the bounding boxes 122, 126 enlarged compared to FIG. 1*a*. From T2 150 to T3 170, the camera system 1000 is panned horizontally towards the object 128 on the right hand side of the scene as shown on the display screen 1023. While the camera system 1000 is being panned, the camera system 1000 is configured to automatically zoom-in on the scene comprising the object 128. At T3 170, the display screen 1023 shows a more zoomed-in view of the object 128 compared to FIG. 1*b*. As seen in FIG. 1*c*, the object 124 is exiting the scene. The object 128 as seen at T3 170 is enlarged and the bounding box 126 is enlarged compared to FIGS. 1*a* and 1*b*. From T3 170 to T4 190, the camera system 1000 pans horizontally towards the object 128 displayed on the right hand side of the display 160. While the user is panning the camera system 1000, the camera system 1000 is configured to automatically zoom-in. As seen in FIG. 1*d*, the panning of the camera system 1000 is stopped at T4 190 and the object 128 is the only object displayed on the display 180. The object 128 is enlarged compared to FIG. 1*c*. Similarly, the bounding box 126 is enlarged compared to FIG. 1*c*.

Automatically zooming the camera system 1000 as described above allows a user to select which object is a next region of interest. The camera system 1000 automatically controls the lens controller 1018 which moves one or more of the lens groups 1010, 1012, 1013 and 1017 to achieve a desired zoom level on that region of interest without a user pushing zoom buttons 1029, 1030. Automatically zooming the camera system 1000 is advantageous over conventional methods that depend on automatic selection of the region of interest. The camera system 1000 is configured such that the zoom level depends on a region of interest indicated by the user through movement of the camera system 1000. The zoom level may also be dependent on characteristics of the movement of the camera system 1000 such as the speed of panning.

Figure 2:
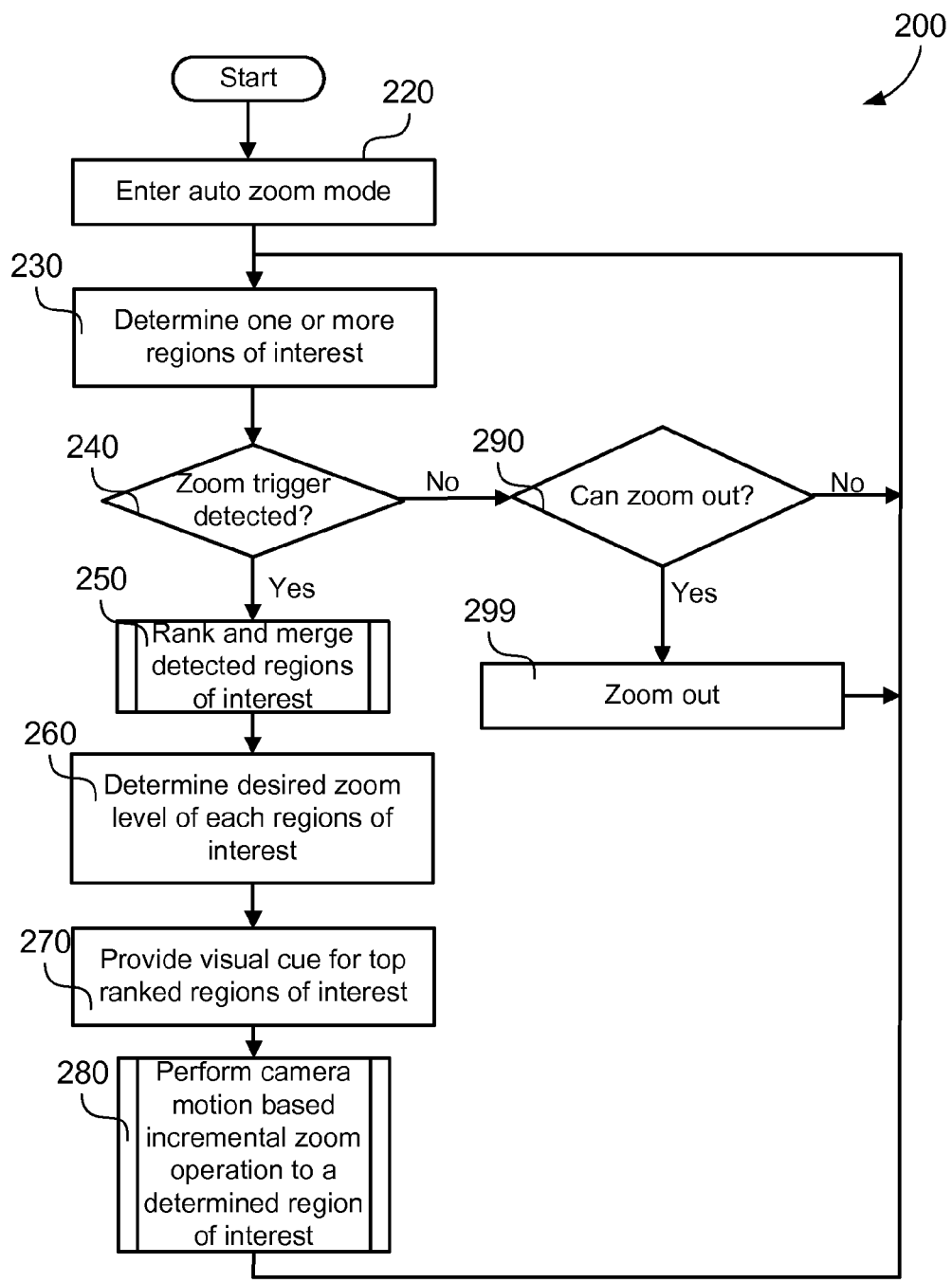
FIG. 2 is a schematic flow diagram showing a method of performing a zoom operation.
Figure 3:
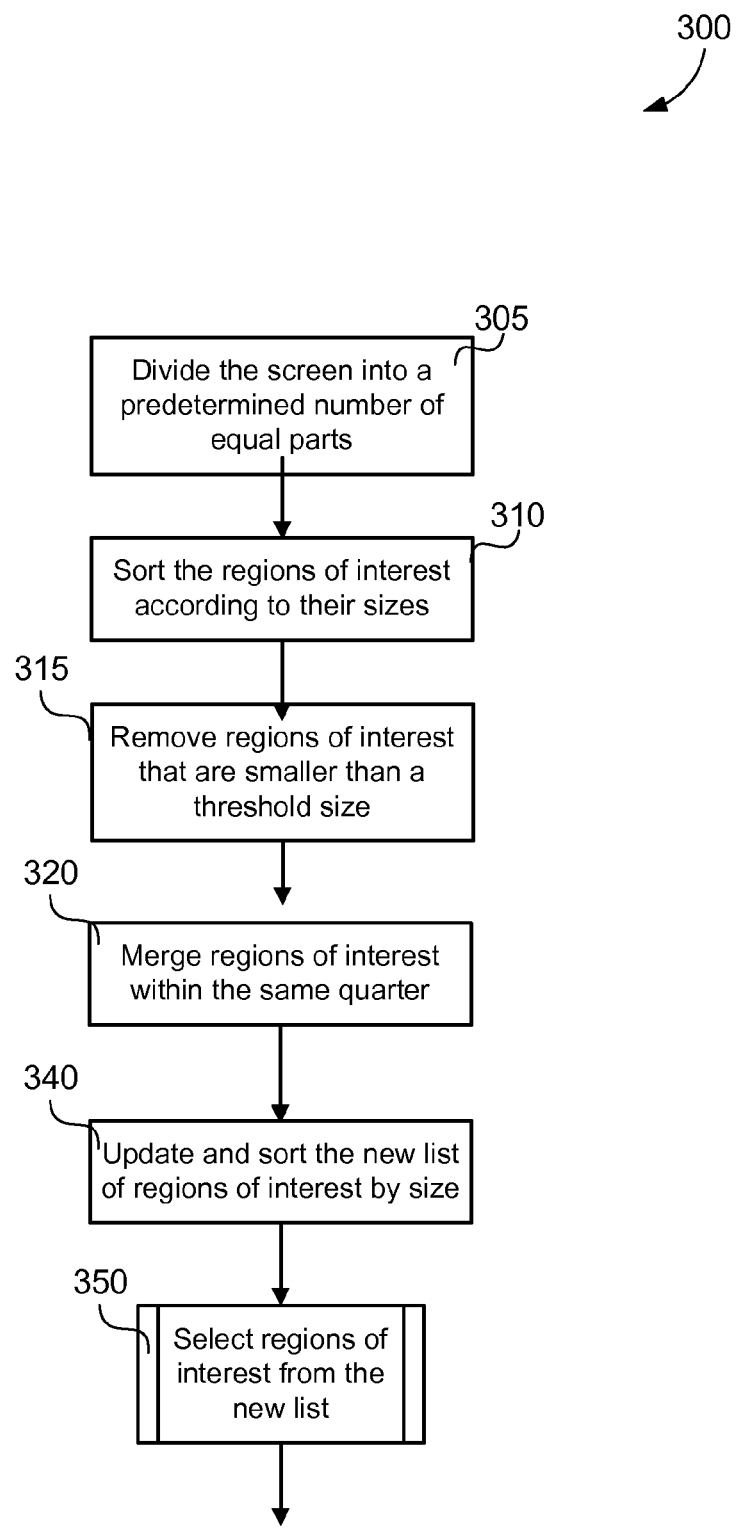
FIG. 3 is a schematic flow diagram showing a method of ranking and merging regions of interest (ROI).

The method 200 of performing a zoom operation on the camera system 1000 (see FIGS. 10A and 10B), will now be described with reference to FIG. 2. The method 200 may be implemented as one or more code modules of the firmware resident within the ROM memory 1060 of the camera system 1000 and being controlled in its execution by the processor 1050.

The camera system 1000 is typically in an initial state prior to execution of the method 200. Then at switching step 220, the processor 1050 switches the camera system 1000 to auto zoom mode. In one implementation, the processor 1050 switches the camera system 1000 to auto zoom mode by default. In other implementations, the processor 1050 switches the camera system 1000 to auto zoom mode upon the processor 1050 detecting a button click (e.g., pressing one of the buttons 1029 or 1030) or a voice command from the user. In still another implementation, the auto zoom mode is activated according to camera configuration. For example, if the camera system 1000 is still for more than three seconds, then the auto zoom mode may be activated.

Then at determining step 230, the processor 1050 performs the step of determining one or more regions of interest within a captured image of a scene. In one implementation, the processor 1050 may determine a plurality of regions of interest. In the example of FIGS. 1*a* to 1*d*, the bounding boxes 122 and 126 around objects 124 and 128 may form the determined regions of interest. Details of the regions of interest may be stored as a list within RAM 1070.

Various methods may be used at step 230 for determining regions of interest in the scene. In one implementation, the regions of interest are determined using the result of face detection. In another implementation, images captured by the camera system 1000 may be compared to a database of, for example, famous buildings, so that prominent architectural features may be extracted from the images in order to determine the regions of interest within the scene.

In still another implementation, a saliency map (i.e., modeled as a dynamic neural network) for static attention is determined for each frame captured by the camera system 1000. The regions of interest are determined using the saliency map. The saliency map may be configured within the RAM 1070. The saliency map is determined from saliency maps of color contrasts, intensity contrasts and orientation contrasts. Contrast is defined as centre-surround differences.

For example, intensity contrast is detected by detecting a dark centre on bright surrounds or vice versa. A saliency map may be used to model the principle of retina and visual cortex which are sensitive to local spatial discontinuities, and for detecting locations which stand out from their surroundings. A static attention score S may be determined as the sum of the normalized values from the saliency maps of color, intensity and orientation using Equation 1, as follows:

$$S = \tfrac{1}{3}(N(\overline{I}) + N(\overline{C}) + N(\overline{O})) \tag{1}$$

where $N(\overline{I})$ represents a normalized intensity value, $N(\overline{C})$ represents a normalized color value and $N(\overline{O})$ represents a normalized orientation value.

In detection step 240, the processor 1050 performs the step of detecting a zoom trigger for altering a zoom level of the camera system 1000. If such a zoom trigger is detected by the processor 1050 then the method 200 proceeds to ranking step 250. Otherwise, the method 200 proceeds to determination step 290. In one implementation, the zoom trigger detected at step 240 is based on no regions of interest being detected. Accordingly, if the processor 1050 determines that no regions of interest were determined at step 230, then at step 240 the method 200 proceeds to step 290.

At ranking step 250, the number of regions of interest determined at step 230 may be examined. If the number of regions of interest is greater than zero, then the regions of interest (ROI) are ranked and merged. A method 300 of ranking and merging regions of interest, as executed at step 230, will be described in detail below with reference to FIG. 3.

As described above, if no region of interest is determined at step 240, then the method 200 proceeds to determination step 290. At determination step 290, the processor 1050 determines if the camera system 1000 can zoom out. If the camera system 1000 is already fully zoomed out, then the method 200 returns to step 230. As a result, if no regions of interest are detected at step 240, then the camera system 1000 loops from step 230, to step 240, to step 290 and back to step 230.

From step 290, if the processor 1050 determines that the camera system 1000 can zoom out, then the method 200 proceeds to zoom out step 299. At zoom out step 299, the processor 1050 performs the step of performing a zoom-out operation. In particular, at step 299, the processor 1050 will signal the lens controller 1018 to move one or more of the lens groups 1010, 1012, 1013 and 1017 to perform a zoom out operation by a predefined amount. In one implementation, the predefined amount is set to half a degree. Accordingly, the zoom out operation is performed at step 299 if the processor 1050 determines that such a zoom out operation is necessary. For example, the zoom out operation is performed if no regions of interest are determined and the camera system 1000 is not already fully zoomed out.

Following step 250, the method 200 continues at determining step 260, where the processor 1050 determines a desired zoom level for each region of interest. The zoom level for a particular region of interest corresponds to a target image frame containing that particular region of interest. The target image frame containing the particular region of interest may be displayed on the display screen 1023.

Figure 8:
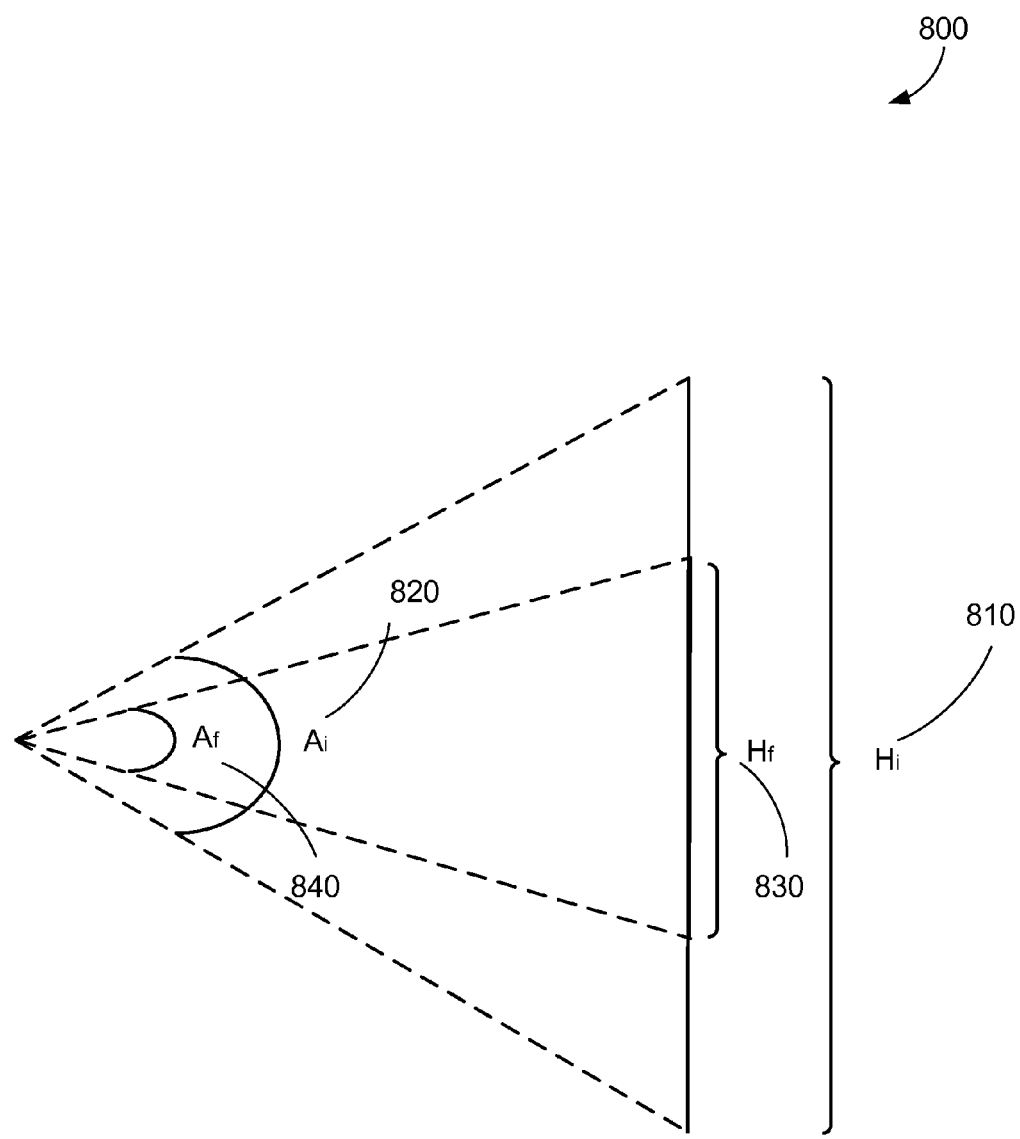
FIG. 8 is a diagram showing how desired zoom level may be determined.
Figure 9:
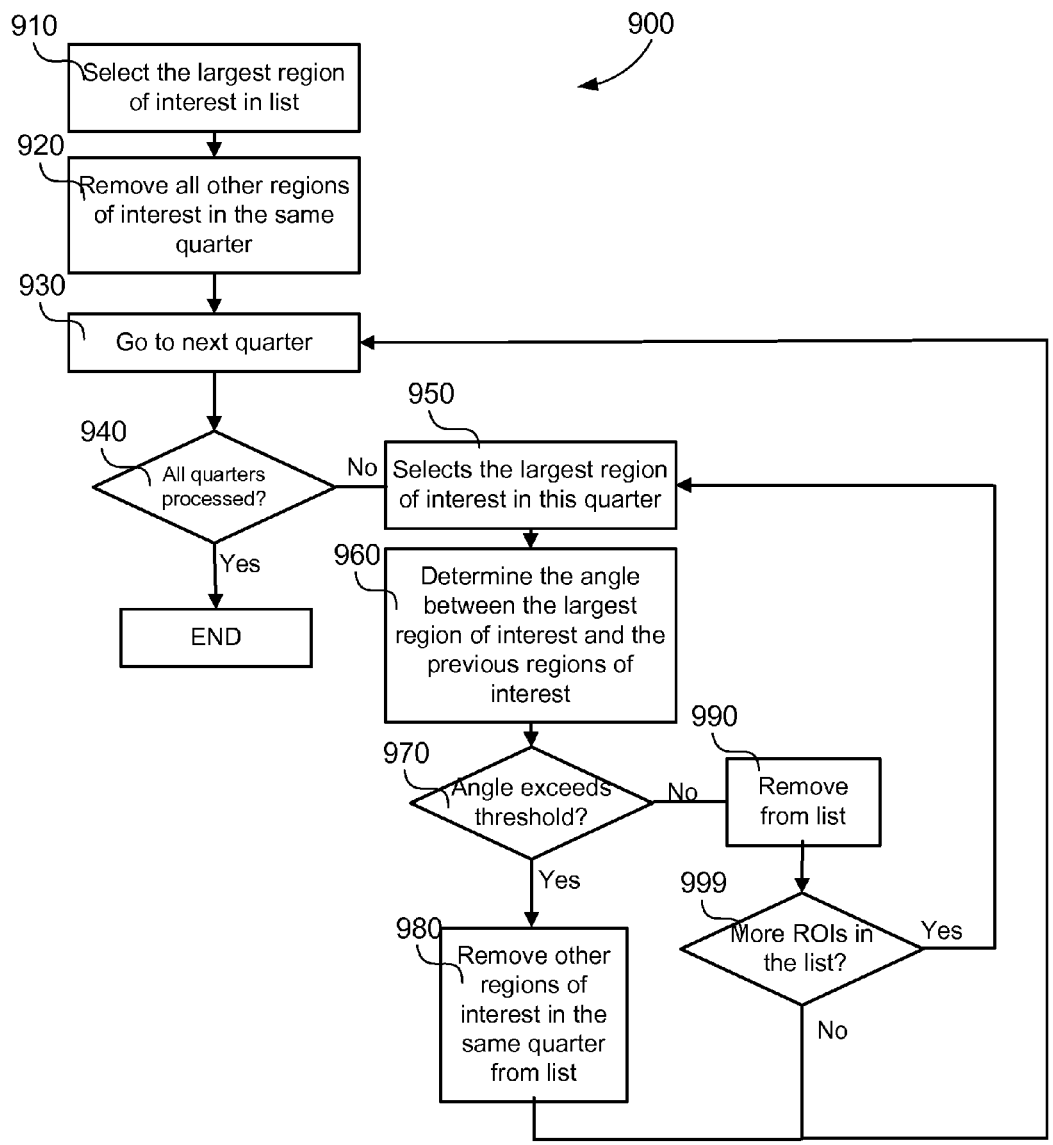
FIG. 9 is a flow diagram showing a method of selecting a region of interest.

In one implementation, the camera system 1000 specifies zoom level by angular degree. For example, as shown in FIG. 8, initial height of a scene containing a particular region of interest is Hi 810, and initial angle is Ai 820. Target height Hf 830 and desired (or target) angle is Af 840. Desired zoom angle $A_f$, representing a zoom level for the particular region of interest, may be determined in accordance with Equation (2) as follows:

$$A_f = 2\arctan\!\left(\frac{H_f}{H_i}\tan\!\left(\frac{A_i}{2}\right)\right) \tag{2}$$

As described above the zoom level for a particular region of interest corresponds to a target image frame containing that particular region of interest. Accordingly, at step 250, the processor 1050 performs the step of selecting a target image frame containing a region of interest that the camera system 1000 is moving towards.

Then at inputting step 270, the processor 1050 provides visual cues for top ranked regions of interest. In one implementation, the camera system 1050 may provide the visual cues using a bounding box which surrounds a region of interest.

The method 200 continues at the next step 280, where the camera system 1000 performs a camera motion based incremental zoom operation to a determined region of interest. The zoom operation is initiated by the processor 1205 in response to the camera motion before the determined region of interest occupies the centre of a subsequent image frame captured by the camera system 1000. A method 500 of performing a camera motion based incremental zoom operation, using camera motion based incremental zoom, as executed at step 280, will be described in detail below with reference to FIG. 5.

Following any one of steps 280, 290 or 299, the method 200 returns to step 230, where the processor 1050 performs the step of determining one or more further regions of interest within the captured image of a scene. The method 300 of ranking and merging regions of interest (ROIs), as executed at step 230, will now be described with reference to FIG. 3. The method 300 will be described by way of example with reference to FIG. 4 which shows a frame 410 (i.e., representing a scene) displayed on the display screen 1023. The method 300 may be implemented as one or more code modules of the firmware resident within the ROM memory 1060 of the camera system 1000 and being controlled in its execution by the processor 1050.

The method 300 begins at dividing step 305, where the display screen 1023 is divided by the processor 1050 into a predetermined number of equal sized parts. In one implementation, the predetermined number is set to four as shown by phantom lines 420, 430 in FIG. 4. Accordingly, the display 1030 is divided into quarters. The lines 420 and 430 cross at a crossing point 499 in the centre of the display 1030. The crossing point 499 coincides with the centre of an image frame 410 currently being displayed on the display screen 1023. The currently displayed image frame 410 may be stored within the RAM 1070.

Then at sorting step 310, regions of interest are sorted by the processor 1050 according to the size of each region of interest to form a list of regions of interest configured within the RAM 1070.

Figure 4:
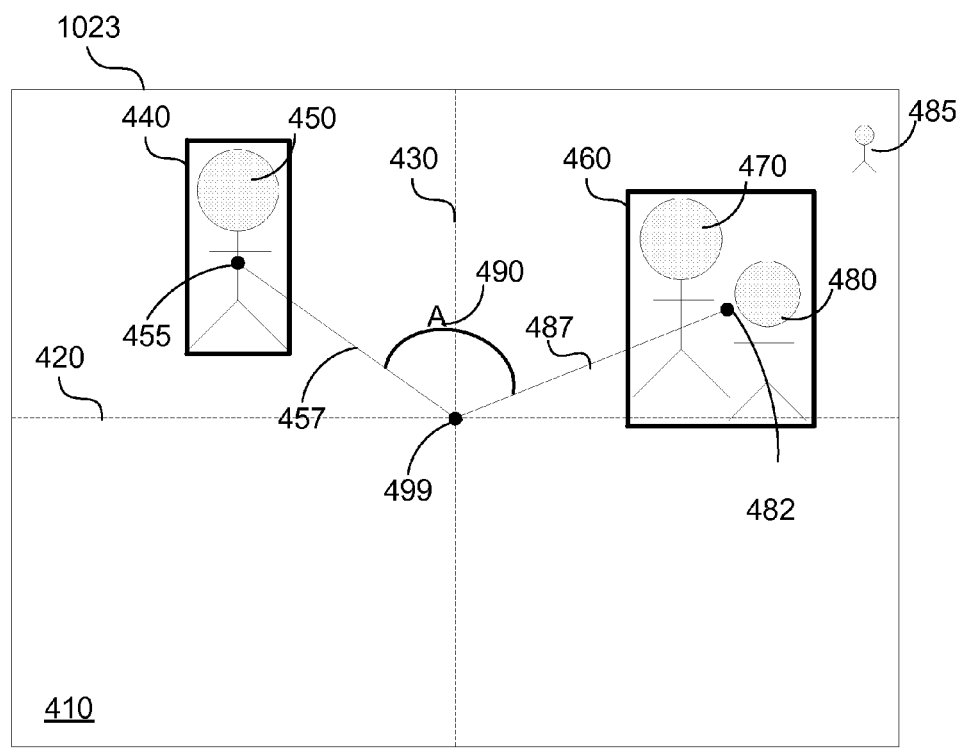
FIG. 4 is a diagram showing an example result of ranking and merging Regions of Interest (ROI).

Then at removing step 315, regions of interest which are smaller than a predefined size threshold are removed from the list. In one implementation, the size threshold is set to one tenth of the size of a quarter of the resolution of the camera display screen 1023. In another implementation, the size threshold is set to one fifth of the largest region of interest in a same quarter of the camera display screen 1023. In still another implementation, the size threshold is set to one tenth of the size of a quarter of the resolution of the image sensor 1021. As seen in FIG. 4, on the top left hand quarter of the display screen 1023, there is an object 450 surrounded by a bounding box 440. The centre of the region of interest is depicted using black dot 455. On the top right hand quarter of the display screen 1023, there are three (3) objects 470, 480 and 485. In accordance with the example of FIG. 4, since the objects 470, 480 are bigger than the size threshold (e.g., as used in step 315), the objects 470 and 480 are kept in the region of interest list configured within RAM 1070. On the contrary, since the object 485 is smaller than the size threshold, no visual cue (e.g., a bounding box) is provided for the object 485.

Then at merging step 320, the processor 1050 merges the regions of interest whose distance is less than a distance threshold within the same quarter of the display screen 1023 to form a new list configured within the RAM 1070. The distance threshold is a threshold on distance between two points which represent the centre of mass 455, 482 of two regions of interest 440 and 460 as seen in FIG. 4. In one implementation, the distance threshold value is set to fifty (50) pixels. In another implementation, the distance threshold is set to one tenth of the width of the display screen 1023. In the example of FIG. 4, since the distance between objects 470, 480 is smaller than the distance threshold, the objects 470 and 480 merge into one region of interest 460 as described in step 320. In the example of FIG. 4, the objects 470, 480 are surrounded by one large bounding box 460 representing the region of interest.

At sorting step 340, the regions of interest of the new list are sorted by size. Then at selecting step 350, the processor 1050 selects regions of interest from the sorted new list formed in steps 320 and 340. A method 900 of selecting regions of interest displayed on the display screen 1023, as executed at step 350, will now be described with reference to FIG. 9.

The method 900 may be implemented as one or more code modules of the firmware resident within the ROM memory 1060 of the camera system 1000 and being controlled in its execution by the processor 1050.

The method 900 begins at selecting step 910, where the processor 1050 selects the largest region of interest in the new list configured within the RAM 1070. Then the processor 1050 removes all other regions of interest in the same quarter of the display screen 1023 as the largest region of interest, from the new list, in removing step 920. By removing all other regions of interest in the same quarter of the display screen 1023 from the new list, the processor 1050 finalizes the selected region of interest in that image quarter.

Next, at incrementing step 930, the processor 1050 goes to a next clockwise quarter of the display screen 1023. At checking step 940, if all of the quarters have been processed, then the method 900 concludes. Otherwise, the processor 1050 selects the largest region of interest in the next quarter at selecting step 950.

Then at step 960, the angle A 490 (see FIG. 4) between the region of interest selected at step 950 and the previously finalized region of interest (i.e., the region of interest selected at step 910) are determined at determining step 960. The determination of the angle A 490 will be described in further detail below. Next, at comparing step 970, the angles determined in step 960 are compared to an angle threshold value. The angle threshold value is used to distinguish camera motion direction towards different regions of interest. If two regions of interest are too close, then the camera system 1000 does not know which region of interest the camera system 1000 is moving towards. In one implementation, the angle threshold value is fifty (50) degrees. If all angles exceed the angle threshold value at step 970, then the method 900 proceeds to removing step 980. At removing step 980, all other regions of interest in the same quarter as the angles selected at step 950 are removed from the new list configured within the RAM 1070 and the method 900 loops back to step 930. If one of the angles selected at step 950 does not exceed the angle threshold value, then the region of interest associated with the angle is removed from the new list at removing step 990.

Next, at checking step 999, if the processor 1050 determines that more regions of interest are in the new list, then the method 900 loops back to step 950. Otherwise, the method 900 loops back to incrementing step 930.

Returning to the example of FIG. 4, angle A 490 is determined using the angle formed by line 487 and line 420 minus the angle formed by line 457 and line 420. Since the angle A 490 is greater than the angle threshold described in step 970, both of regions of interest represented by objects 470 and 480 are recognized as the final region of interest represented by bounding box 460 in the example scene of FIG. 4.

Figure 5:
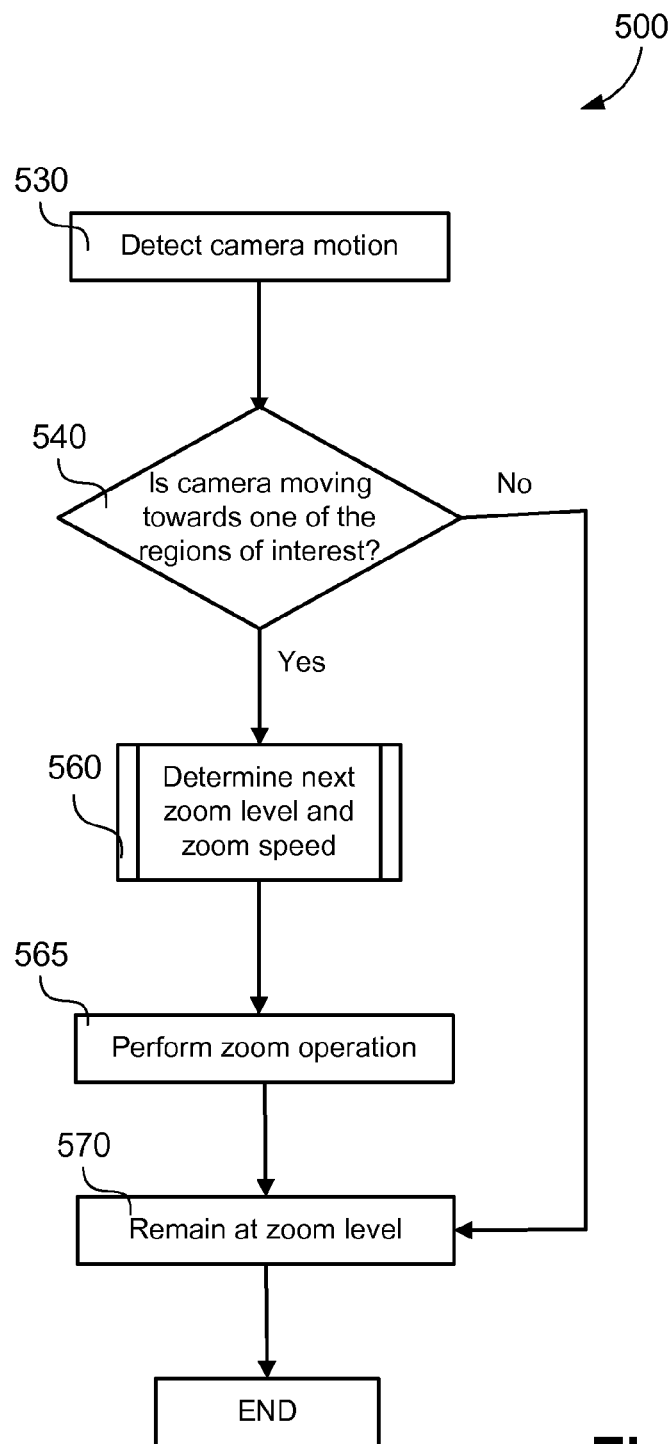
FIG. 5 is a schematic flow diagram showing method of performing a camera motion based incremental zoom operation, as executed in the method of FIG. 2.
Figure 6:
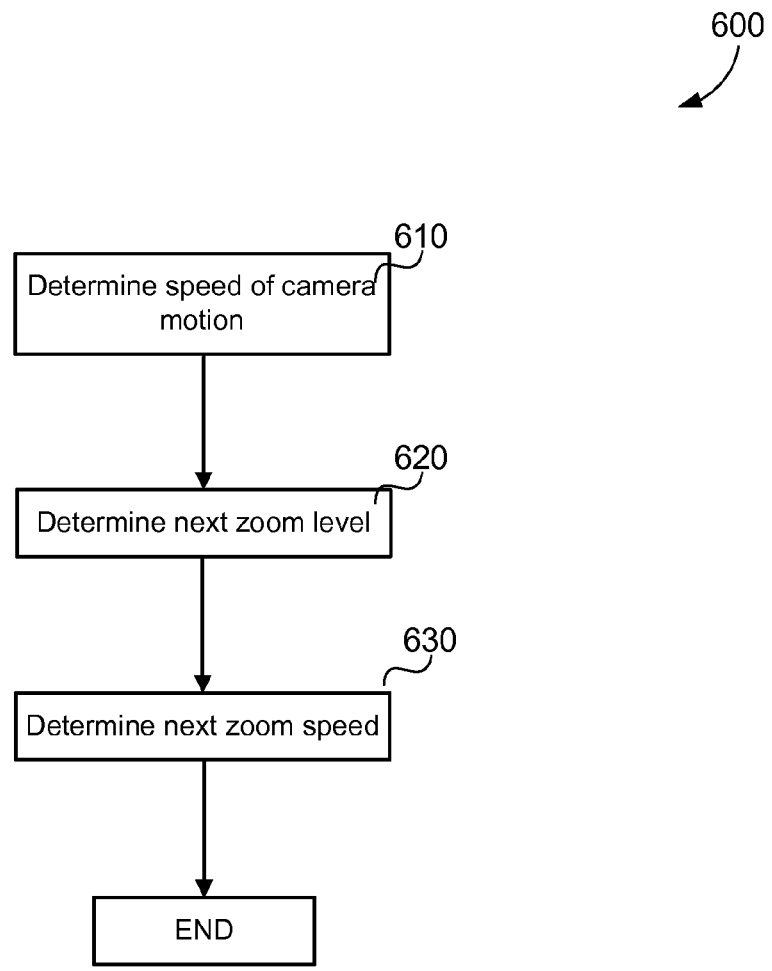
FIG. 6 is a flow diagram showing a method of determining a zoom level and zoom speed.

The method 500 of performing a camera motion based incremental zoom operation, as executed at step 280, will now be described with reference to FIG. 5. The method 500 may be implemented as one or more code modules of the firmware resident within the ROM memory 1060 of the camera system 1000 and being controlled in its execution by the processor 1050.

The method 500 begins at detection step 530, where the processor 1050 performs the step of detecting any camera motion, for example, towards one of the regions of interest. In particular, the processor 1050 detects type of camera motion, direction of camera motion and number of pixels moved. In one implementation, the processor 1050 uses motion vectors extracted from a compressed video stream captured by the camera system 1000, to detect camera motion. The extracted motion vectors may be compared with exemplar motion vector "pan", "tilt" and "zoom" patterns to determine the camera motion. The exemplar motion vector "pan", "tilt" and "zoom" patterns may be stored in the storage 1092. The processor 1050 may feed the motion vectors to an affine camera motion model to estimate the number of pixels changed caused by pan tilt zoom motions.

Then at determining step 540, camera motion direction is determined by the processor 1050. If the processor 1050 determines that the camera system 1000 is moving towards one of the regions of interest, then the processor 1050 proceeds to determination step 560 to determine a next zoom level and zoom speed for the region of interest. The next zoom level corresponds to an image frame (i.e., the target image frame) for the region of interest. Otherwise, the method 500 proceeds to step 570. As described below, the zoom speed may be determined based on the speed of motion of the camera system 1000 and the distance from a current image frame to a target image frame. A method 600 of determining a zoom level and zoom speed, as executed at step 560, will be described in detail below.

At the next step 565, processor 1050 performs the step of performing the zoom operation to the target image frame using the determined zoom speed. The zoom operation is initiated by the processor 1205 in response to the camera motion before the target region of interest occupies the centre of the target image frame captured by the camera system 1000. In particular, the processor 1050 controls the lens controller 1098 to move one or more of the lens groups 1010, 1012, 1013 and 1017 to zoom-in to the zoom level with the zoom speed determined in determining step 560. Then the camera system 1000 remains at that zoom level in step 570.

As described above, if the processor 1050 determines that the camera system 1000 is not moving towards one of the regions of interest, then the processor 1050 goes directly to step 570.

The method 600 of determining a zoom level and zoom speed, as executed at step 560, will be described in detail below. The method 600 will be described by way of example with reference to FIGS. 7a, 7b and 7c. The method 600 may be implemented as one or more code modules of the firmware resident within the ROM memory 1060 of the camera system 1000 and being controlled in its execution by the processor 1050.

The method 600 begins at step 610, where the processor 1050 performs the step of determining speed of motion of the camera system 1000 (i.e., Pan Speed (PS)) when the camera system 1000 is being panned. The determination of the speed of motion of the camera system 1000 (i.e., Pan Speed) will be described in detail below with reference to FIGS. 7a, 7b and 7c.

Figure 11:
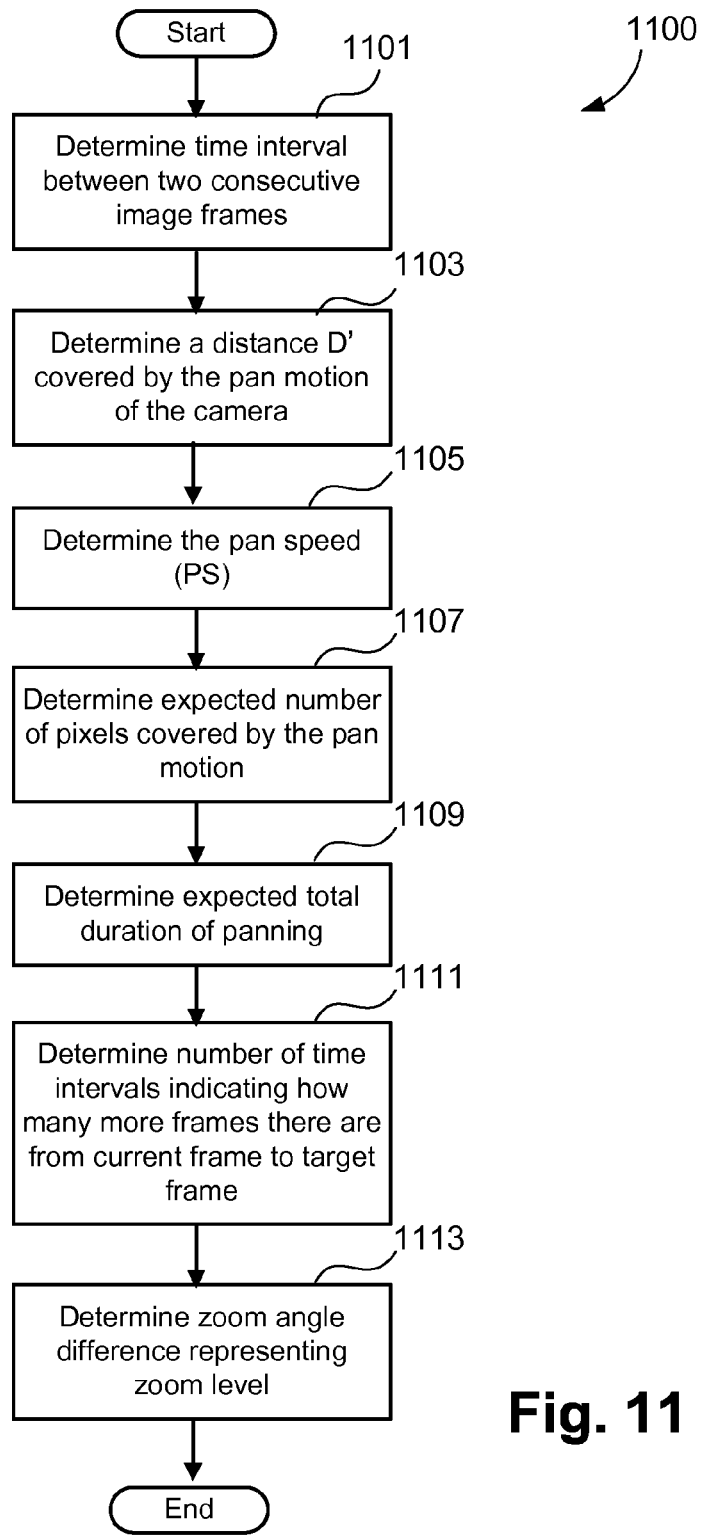
FIG. 11 is a flow diagram showing a method of determining zoom level.

At the next step 620, the processor 1050 determines a next zoom level (or zoom-in level). As will be described below with reference to FIGS. 7a, 7b and 7c, in one implementation, the zoom level may be specified by angle. A method 1100 of determining zoom level will be described in detail below with reference to FIG. 11.

The method 600 concludes at the next step 630, where the processor 1050 performs the step of determining a next zoom speed (or zoom-in speed). The zoom speed is determined based on speed of camera motion and distance from a current image frame to a target image frame. Again, the determination of the zoom speed will be described in more detail below.

After completing determination of the next zoom level and zoom speed, the zoom operation may be performed as at step 565.

Figure 7A:
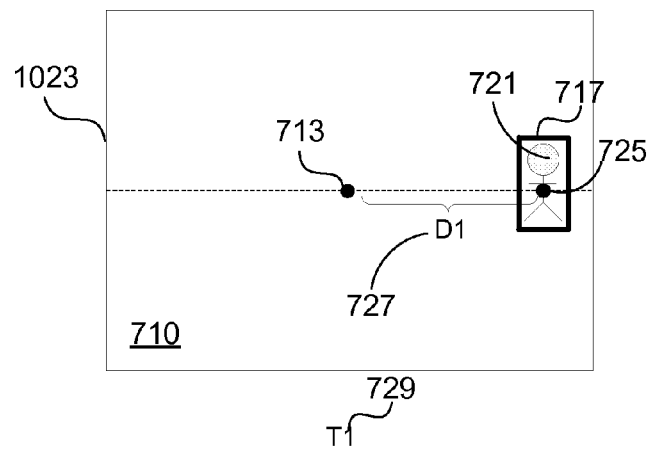
FIGS. 7a, 7b and 7c each represent consecutive frames captured by a camera system at different points in time.
Figure 7B:
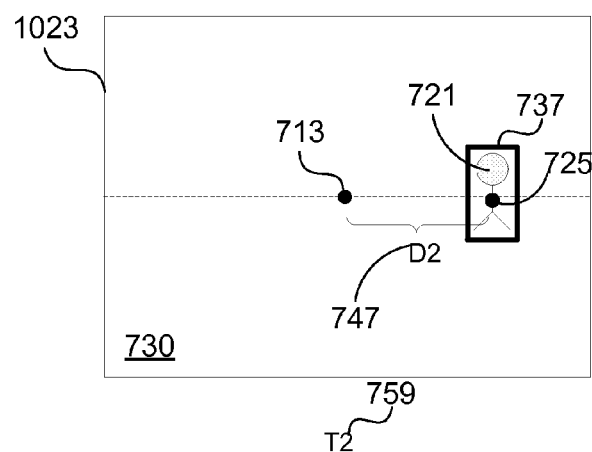
Figure 7C:
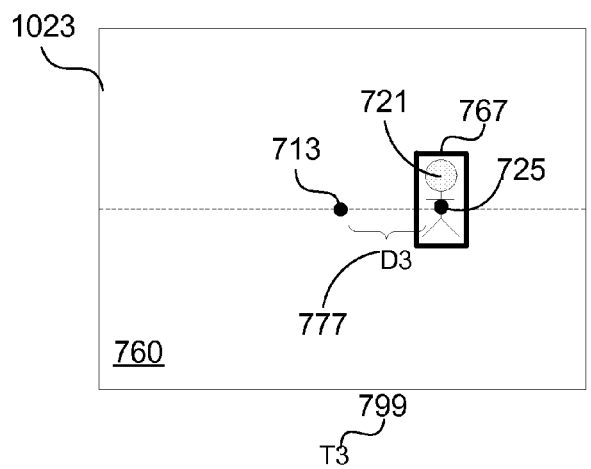

FIG. 7a, FIG. 7b and FIG. 7c represent three points in time T1 729, T2 759 and T3 799 during motion (or movement) of the camera system 1000. The units of time T1 729, T2 759, and T3 799 are expressed in milliseconds (ms). The term "Ts" refers to time when pan motion of the camera system 1000 is completed. FIG. 7a and FIG. 7b show two consecutive image frames 710 and 730 displayed on the display 1023 at different points in time. FIG. 7c denotes a final target image frame 760 displayed on the display 1023. The target image frame 760 may also be referred to as a "target zoom view". The black dot 713, in each of FIGS. 7a, 7b and 7c, refers to the centre of the display 1023 at different points in time. Each of FIGS. 7a, 7b and 7c show an object 721 at different points in time. The object 721 is surrounded by a bounding box 717. The black dot 725 refers to the centre of the bounding box 717.

D1 727 refers to distance expressed in pixels between dot 713 and dot 725 at time T1 729. D2 747 refers to the distance expressed in pixels between dot 713 and dot 725 at time T2 759. D3 refers to the distance expressed in pixels between dot 713 and dot 725 at time T3 799.

The determination of zoom level and zoom speed at steps 630 and 620, respectively, will be described by way of example with reference to FIGS. 7a to 7c and FIG. 11.

The method 1100 of determining a zoom level may be implemented as one or more code modules of the firmware resident within the ROM memory 1060 of the camera system 1000 and being controlled in its execution by the processor 1050.

The method 1100 begins at step 1101, where the processor 1050 determines a time interval T' between two consecutive image frames. The time interval T' represents the frame capture rate of the camera system 1000. In particular, with reference to the example of FIGS. 7a and 7b, at step 1101, the processor 1050 subtracts T1 729 from T2 759 in accordance with Equation (3), as shown below:

$$T' = T2\ 759 - T1\ 729 \quad (3)$$

At the next step 1103, the processor 1050 determines a distance D' covered by the pan motion of the camera system 1000 (or camera motion) during the time interval T'. In the example of FIGS. 7a and 7b, the processor 1050 determines the distance D' covered by the pan motion between T1 729 and T2 759 by subtracting D2 747 from D1 727, in accordance with Equation (4), as follows:

$$D' = D1\ 727 - D2\ 747 \quad (4)$$

The method 1100 continues at the next step 1105, where the processor 1050 determines the camera motion speed (CMS) (e.g. pan speed) of the camera system 1000, in pixels per millisecond. In the example of FIGS. 7a and 7b, the camera motion speed (CMS) is determined by dividing D' by T', in accordance with Equation (5), as follows:

$$\text{Camera Motion Speed(CMS)} = D'/T' [\text{pixel/ms}] \quad (5)$$

At the next step 1107, the processor 1050 determines the expected total number of pixels (TNP) covered by the motion (e.g. pan motion) of the camera system 1000. In the example of FIGS. 7a to 7c, the total number of pixels (TNP) is determined by subtracting D3 777 from D1 727, in accordance with Equation (6) as follows:

$$\text{Total Number of Pixels(TNP)} = D1\ 727 - D3\ 777 \quad (6)$$

Then at step 1109, the processor 1050 determines the expected total duration (in milliseconds) of the movement of the camera using the total number of pixels (TNP) divided by camera motion speed (CMS), in accordance with Equation (7) as follows:

$$\text{Total Duration(TD)} = \text{TNP/CMS} \quad (7)$$

The method 1100 continues at the next step 1111, where the processor 1050 determines the number of time intervals, T', indicating how many more frames there are from the current image frame to a target frame. As described above with reference to FIG. 8, the current image frame corresponds to the initial height Hi 810 and initial angle is Ai 820 containing a particular region of interest. The number of time intervals, T', is determined by dividing the total duration, TD, by the time interval, T', in accordance with Equation (8) as follows:

$$\text{Number of } T'(\#T') = TD/T' \quad (8)$$

At the next step 1113, the processor 1050 determines a zoom angle difference by subtracting a predetermined target zoom angle from a current zoom angle, in accordance with Equation (9), as follows:

$$\text{Zoom Angle Difference(AD)} = \text{Current Angle} - \text{Target Angle} \quad (9)$$

The method 1100 concludes at the next step 1115, where the processor 1050 determines average zoom angle per frame representing a zoom level in terms of angle. The zoom level corresponds to the target image frame. The average zoom angle per frame is determined by dividing Zoom Angle Difference (AD) by Target Angle (#T'), in accordance with Equation (10), as follows:

$$\text{Average Zoom Angle per } T' = AD/\#T' \quad (10)$$

Accordingly, the execution of the method 1100 determines a target image frame containing the region of interest which the camera system 1000 is moving towards.

As described above, at step 630 the processor 1050 determines a next zoom speed. In one implementation, a pre-defined set of zoom speed options may be stored within RAM 1070. Each stored zoom speed is specified by angles/ms. After the next zoom level corresponding to a target frame is determined in accordance with the method 1100, the processor 1050 determines the most appropriate zoom speed option.

Zoom speed is a mechanical function of the camera system 1000. The camera system 1000 may have a predetermined number of zoom speed options (e.g., slow, medium, fast), depending on what type of camera the camera system 1000 is and the mechanical configuration of the camera system 1000. The zoom speed determined at step 630 may be determined based on speed of camera motion and distance from a current image frame to a target image frame. For example, if the camera motion speed is high and the distance from the current image frame to the target image frame is small, then the determined zoom speed may be fast. In another example, if the camera motion speed is low and the distance from the current image frame to the target image frame is large, then the determined zoom speed may be slow.

When a user is moving the camera system 1000, the camera system 1000 may be used in a jitter manner introducing an unsmooth zoom effect. In order to reduce jitter, in one implementation, a number of previously determined zoom levels, each corresponding to an image frame, are used for determining a next zoom level corresponding to the target image frame. In this instance, the next zoom level is also specified by radian angle. After the next zoom level is determined in accordance with the method 1100, four previous zoom levels, including the newly determined next zoom level, are added to the next zoom level. The average zoom level value may then be determined as an actual value of the determined next zoom level, corresponding to the target image frame, in accordance with Equation (11), as follows:

$$\text{Angle} = \frac{\sum_{i=1}^{N} A_i}{N} \quad (11)$$

Equation (11) may be referred to as a smoothing function. Accordingly, the target image frame is determined using a smoothing function.

A method 1400 of performing a smooth zoom operation, without manual adjustment (i.e., an automatic zoom operation), on a pan-tilt-zoom (PTZ) network surveillance camera 1200 (see FIG. 12), will be described below.

Figure 12:
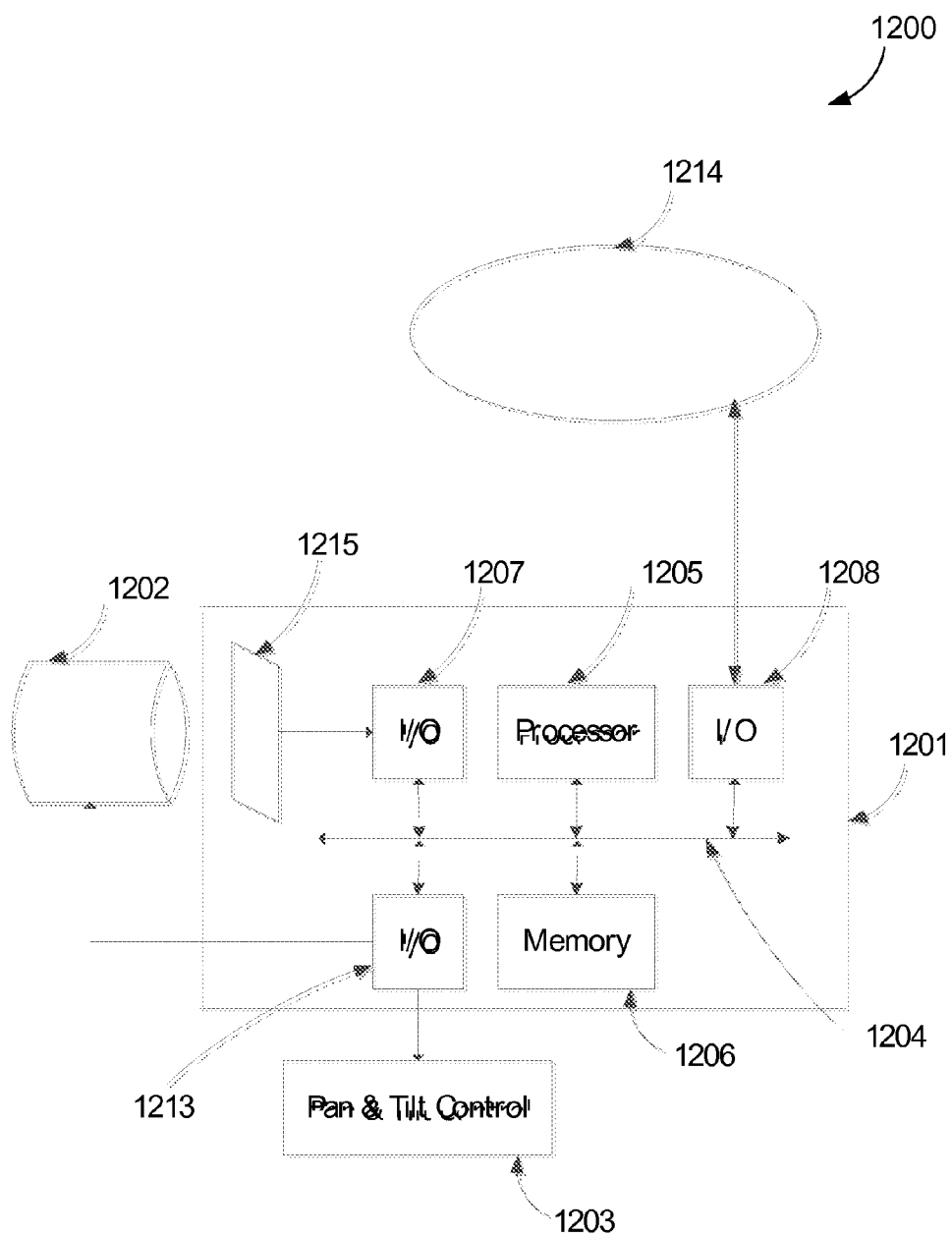
FIG. 12 is a functional block diagram of a network camera.

FIG. 12 shows a functional block diagram of the network camera 1200, upon which the method 1400 may be implemented. The camera 1200 is a pan-tilt-zoom (PTZ) camera comprising a camera module 1201, a pan and tilt module 1203, and a lens system 1202. The camera module 1201 typically comprises at least one processor unit 1205 and a memory unit 1206. The camera module 1201 also comprises a photo-sensitive sensor array 1215 and a first input/output (I/O) interface 1207 that couples to the sensor array 1215. The camera module 1201 also comprises a second input/output (I/O) interface 1208 that couples to a communications network 1214. The communications network 1214 may be a wide-area network (WAN), such as the Internet, a cellular telecommunications network, or a private WAN. The camera module 1201 also comprises a third input/output (I/O) interface 1213 for the pan and tilt module 1203 and the lens system 1202.

The components 1207, 1205, 1208, 1213 and 1206 of the camera module 1201 typically communicate via an interconnected bus 1204 and in a manner which results in a conventional mode of operation known to those in the relevant art.

Figure 13:
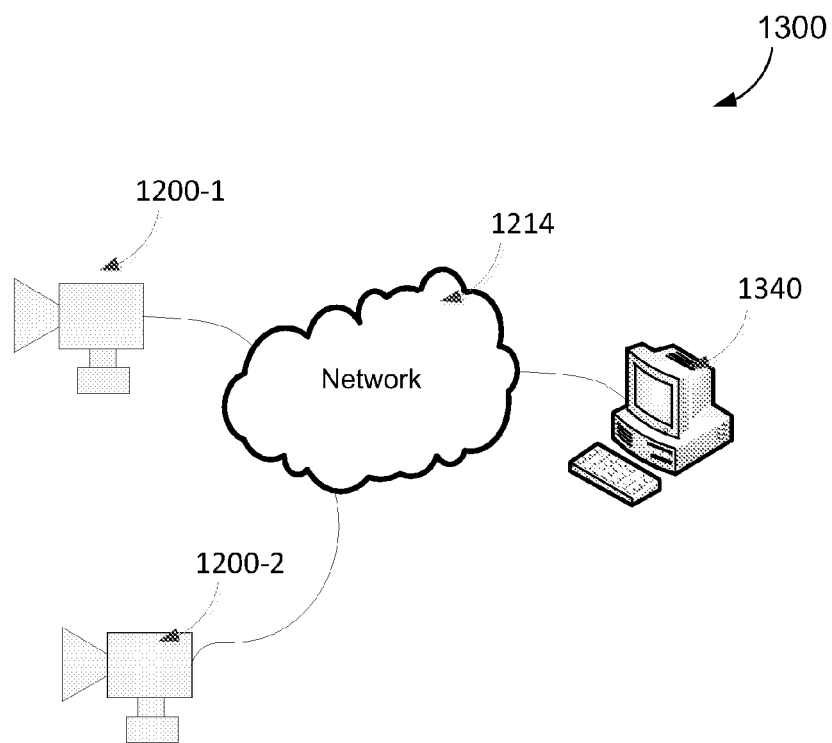
FIG. 13 is a diagram showing an example of a network of two pan-tilt-zoom (PTZ) cameras controlled by a personal computer (PC).

FIG. 13 shows an example of a camera system 1300 comprising two of the PTZ camera 1200 (i.e., camera 1200-1 and camera 1200-2) of FIG. 12 controlled by a general-purpose computer system 1340, via the communications network 1214. Examples of computers which may be used for the computer system 1340 include IBM-PC's and compatibles, Sun Sparcstations, Apple Mac™ or a like computer systems. As seen in FIG. 13, the cameras 1200-1 and 1200-2 are both connected to the network 1214. In one implementation, the computer system 1340 communicates with the cameras 1200-1 and 1200-2 via the network 1214 by sending commands using hyper-text transfer protocol (HTTP).

One of the functions that the PTZ cameras 1200-1 and 1200-2 may perform is called "pre-set tour". In the example of FIG. 13, a list of predefined pan-tilt-zoom (PTZ) positions defining a pre-set tour is stored in the memory unit 1206 of one of the cameras such as the camera 1200-1. In this instance, upon receiving HTTP commands from the computer system 1340, via the I/O module 1208, the processor 1205 of the camera 1200-1 changes the PTZ position of the camera 1200-1. In particular, the processor 1205 of the camera 1200-1 changes the PTZ position of the camera 1200-1 to one of the PTZ positions stored in the memory unit 1206, using the pan and tilt control module 1203. When the camera 1200-1 arrives at the next PTZ position, the camera 1200-1 stays in that PTZ position for a specified duration before the camera 1200-1 moves to a further PTZ position. The camera 1200-1 visits all of the PTZ positions in the predefined list of PTZ positions stored in the memory unit 1206. Accordingly, by visiting all of the PTZ positions, the camera 1200-1 has performed the pre-set tour.

Automatic-zooming the PTZ camera 1200-1 configured with pre-set tour allows specification of a pan and tilt position without predetermining the correct zoom level during setup time. Such a function is advantageous when the PTZ camera 1200-1 is used in a video conferencing environment, for example, in which case the position of a speaker can be predetermined but correct zoom level cannot be predetermined correctly.

Figure 14A:
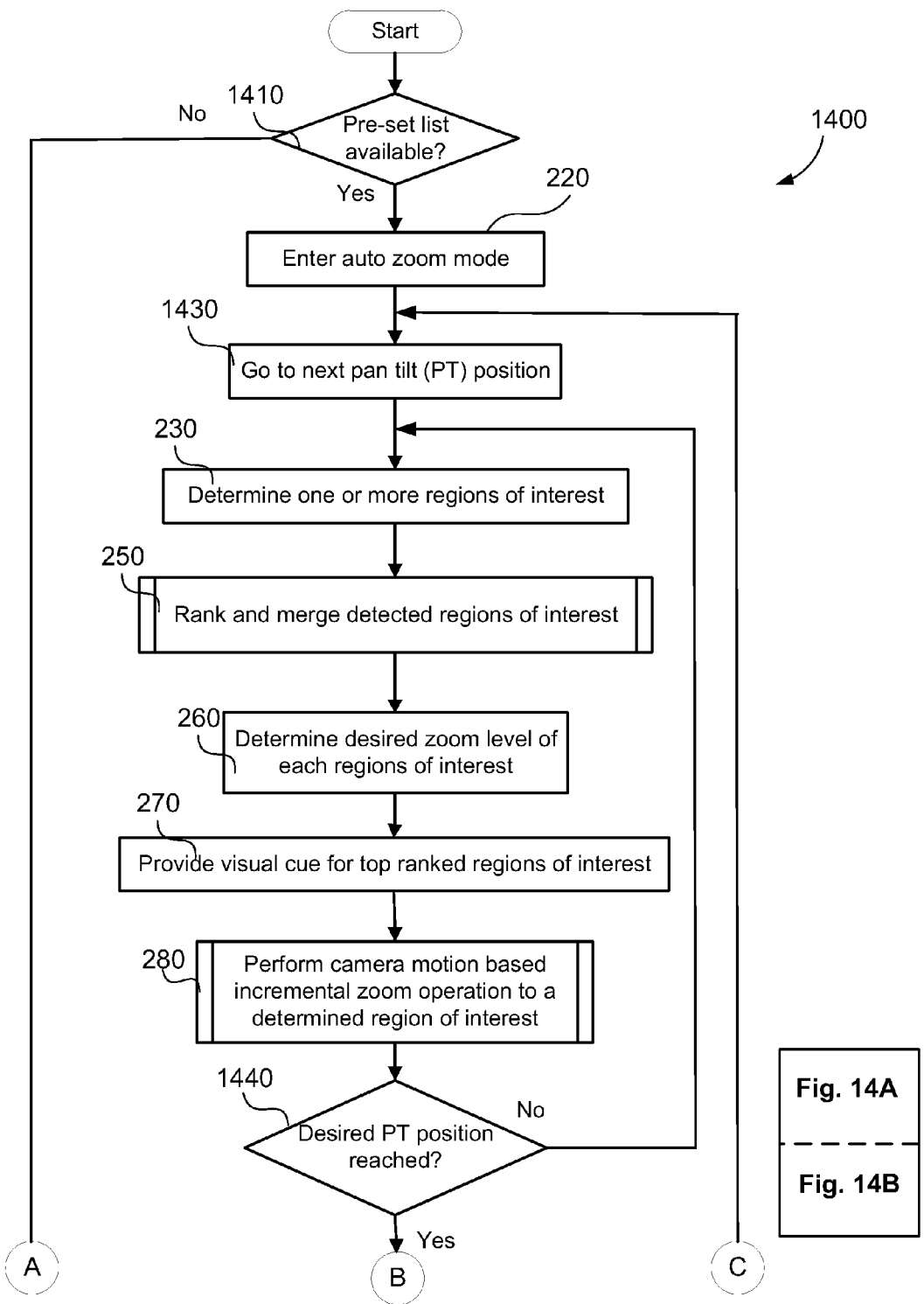
FIG. 14 is a flow diagram showing a method of performing a zoom operation on a PTZ camera that has pre-set tour.
Figure 14B:
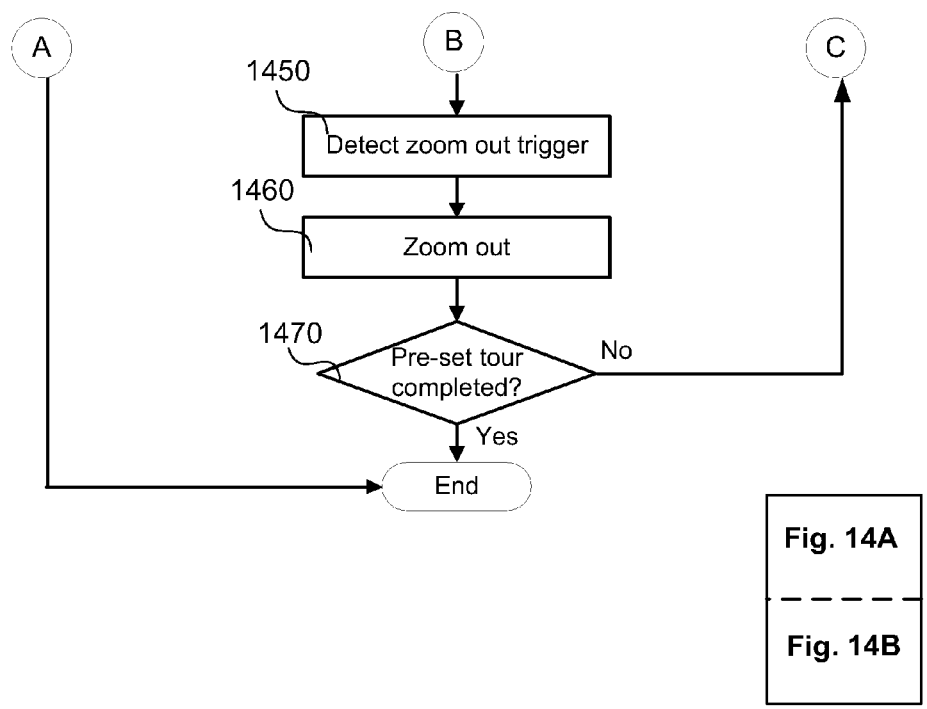

The method 1400 will be described with reference to the camera 1200-1. However, the method 1400 is also relevant to the camera 1200-2, as both the cameras 1200-1 and 1200-2 have the same configuration, as well as any other similar camera. The method 1400 may be implemented as one or more code modules of firmware resident within the memory 1206 of the camera system 1200 and being controlled by its processor 1205. The steps of the method 1400 of FIG. 14 with the same reference numbers as those steps described above with reference to FIG. 2, are essentially performing the same function.

The camera 1200-1 is typically in an initial state prior to execution of the method 1400, and at the initial state, the camera 1200-1 is typically at a fully zoom out position. Then at verifying step 1410, if the processor 1205 determines that no pre-set positions are specified and stored with the memory 1206, then the method 1400 concludes. Otherwise, the processor 1205 determines that there is a list of pre-set positions stored in the memory 1206 and, at switching step 220, the processor 1205 switches the camera 1200-1 to auto zoom mode. Next, at moving step 1430, the camera 1200-1 is moved to a next pre-set pan tilt (PT) position in the list of pre-set positions.

Then at determining step 230, the processor 1205 performs the step of determining one or more regions of interest within a captured image of a scene. In one implementation, the processor 1205 may determine a plurality of regions of interest at step 230. At ranking step 250, the number of regions of interest determined at step 230 may be examined. If the number of regions of interest is greater than zero, then the regions of interest (ROI) are ranked and merged. Following step 250, the method 1400 continues at determining step 260, where the processor 1250 determines a desired zoom level for each region of interest. The zoom level for a particular selected region of interest corresponds to a target image frame containing that particular region of interest. The particular regions of interest may be referred to as a target region of interest.

Then at inputting step 270, the processor 1205 provides visual cues for top ranked regions of interest. In one implementation, the processor 1205 of the camera 1200-1 may provide the visual cues using a bounding box which surrounds a region of interest.

The method 1400 continues at the next step 280, where the camera 1200-1 performs a camera motion based incremental zoom operation to a determined region of interest.

Next at determining step 1450, the processor 1205 determines if the desired pre-set pan tilt (PT) position has been reached. If the desired pre-set pan tilt (PT) position has not been reached, the method 1400 loops back to step 230. If the pre-set pan tilt (PT) position is reached, the method 1400 moves to step 1450. At step 1460, the processor 1205 detects if a zoom out trigger has occurred. In one implementation, if the camera 1200-1 is going to move to the next position, the processor 1205 will signal a zoom out event as trigger.

The camera 1200-1 stays at the current zoom level until a zoom out trigger is detected by the processor 1205. Upon receiving a zoom out trigger, at step 1460, the performs the step of initiating a zoom operation for the selected target region of interest. In particular, the processor 1205 causes the camera 1200-1 to the zoom out according to the zoom level determined at step 260 for the target region of interest. Next, if the processor 1205 determines that all the pre-set positions in the list stored with the memory 1206 have been completed at determining step 1470, then the method 1400 concludes. Otherwise, if there are more pre-set positions to be completed, the method 1400 returns to step 1430.

In still another implementation, after the processor 1205 enters automatic zoom mode 220 as requested by the user, the processor 1205 receives target coordinates of the pre-set position at step 1430, as input by the user. Then, the processor 1205 determines one or more regions of interest in the vicinity of the received target coordinates. For example, if a received target coordinate is in the top-right quadrant of a scene, then the regions of interest in the top-right quadrant are selected. The regions of interest may be obtained using face detection methods or human body detection methods. In this instance, one of the regions of interest may be selected by the processor 1205.

In one implementation, the selection of a target region of interest, where the camera, such as the camera 1200-1 will pan and tilt towards, is based on extra information received by the camera 1200-1. For example, in a video conferencing system, even though there are several regions of interest (several attendees of a video conference) in a vicinity of the pre-set position, the processor 1205 may be configured to detect that one of the attendees is speaking, and thus decide to move towards the speaker.

In another example, in a network video surveillance system, even though there are several regions of interest (people in an airport, for example) in a vicinity of a pre-set position, the processor 1205 may be configured to detect that one of the people is running or is dropping off a suspicious package. In this instance, the processor 1205 may decide that the person with the suspicious or abnormal behaviour is the selected region of interest. In this instance, based on the selected region of interest, the processor 1205 may initiate the zoom operation towards the selected region of interest in response to camera motion, before the selected region of interest occupies the centre area of a new image captured by the camera 1200-1.

The arrangements described are applicable to the computer and data processing industries and particularly for performing a camera zooming operation on a camera system.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

This application claims the benefit under 35 U.S.C. §119 of the filing date of Australian Patent Application No. 2010201740, filed 30 Apr. 2010, hereby incorporated by reference in its entirety as if fully set forth herein.

What is claimed is:

1. A method of performing a zoom operation on a camera, the method comprising:
   determining a plurality of regions of interest within a captured image of a scene;
   determining a camera motion direction which is relatively towards one of the plurality of regions of interest;
   selecting a target region of interest from the determined plurality of regions of interest based on the determined camera motion direction; and
   initiating the zoom operation for the selected target region of interest in response to the camera motion before the target region of interest occupies a center area of a new image captured by the camera.

2. The method according to claim 1, further comprising the steps of:
   determining a speed of motion of the camera;
   determining a zoom speed based on the speed of camera motion and a distance from a current image frame to the target region of interest; and
   the zooming operation being performed using the determined zoom speed.

3. A method of performing a zoom operation on a camera, the method comprising:
   determining a plurality of regions of interest within a captured image of a scene;
   determining a camera motion direction;
   determining a speed of motion of the camera;
   selecting a target region of interest from the determined plurality of regions of interest based on the determined camera motion direction;
   determining a zoom speed based on the speed of camera motion and the distance from a current image frame to the target image frame; and initiating the zoom operation for the selected target region of interest in response to the camera motion before the target region of interest occupies a center area of a new image captured by the camera.

4. The method according to claim 1, wherein a zoom speed to the target region of interest is determined using a smoothing function.

5. The method according to claim 1, wherein the set of regions of interest is determined using a saliency map.

6. The method according to claim 1, wherein the set of regions of interest is determined using face detection.

7. The method according to claim 1, comprising:
detecting a trigger for altering a zoom level;
performing a zoom-out operation if necessary; and
determining one or more further regions of interest.

8. The method according to claim 4, wherein a trigger is based on no region of interest being detected.

9. A method according to claim 1, wherein the selected target region of interest is in a vicinity of a pre-set location received by the camera.

10. A system for performing a zoom operation on a camera, the system comprising:
a memory for storing data and a computer program;
a processor coupled to the memory for executing the computer program, the computer program comprising instructions for:
determining a plurality of regions of interest within a captured image of a scene;
determining camera motion direction which is relatively towards one of the plurality of regions of interest;
selecting a target region of interest from the determined plurality of regions of interest based on the determined camera motion direction; and
initiating the zoom operation for the selected target region of interest in response to the camera motion before the target region of interest occupies a center area of a new image captured by the camera.

11. A system for performing a zoom operation on a camera, the system comprising:
a memory for storing data and a computer program;
a processor coupled to the memory for executing the computer program, the computer program comprising instructions for:
determining a plurality of regions of interest within a captured image of a scene;
determining a camera motion direction towards one of the regions of interest;
determining a speed of motion of the camera;
selecting a target region of interest from the determined plurality of regions of interest based on the determined camera motion direction;
determining a zoom speed based on the speed of camera motion and the distance from a current image frame to the target region of interest; and
initiating the zoom operation for the selected target region of interest in response to the camera motion before the target region of interest occupies a center area of a new image captured by the camera.

12. An apparatus for performing a zoom operation on a camera, the apparatus comprising:
means for determining a plurality of regions of interest within a captured image of a scene;
means for determining camera motion direction which is relatively towards one of the plurality of regions of interest;
means for selecting a target region of interest from the determined plurality of regions of interest based on the determined camera motion direction; and
means for initiating the zoom operation for the selected target region of interest in response to the camera motion before the target region of interest occupies a center area of a new image captured by the camera.

13. An apparatus for performing a zoom operation on a camera, the apparatus comprising:
means for determining a plurality of regions of interest within a captured image of a scene;
means for determining a camera motion direction;
means for determining a speed of motion of the camera;
means for selecting a target region of interest from the determined plurality of regions of interest based on the determined camera motion direction;
means for determining a zoom speed based on the speed of camera motion and the distance from a current image frame to the target region of interest; and
means for initiating the zoom operation for the selected target region of interest in response to the camera motion before the target region of interest occupies a center area of a new image captured by the camera.

14. A non-transitory computer readable medium having a computer program stored thereon, the computer program being configured for performing a zoom operation on a camera, the program comprising:
code for determining a plurality of regions of interest within a captured image of a scene;
code for determining camera motion direction which is relatively towards one of the plurality of regions of interest;
code for selecting a target region of interest from the determined plurality of regions of interest based on the determined camera motion direction; and
code for initiating the zoom operation for the selected target region of interest in response to the camera motion before the target region of interest occupies a center area of a new image captured by the camera.

15. A non-transitory computer readable medium having a computer program stored thereon, the computer program being configured for performing a zoom operation on a camera, the program comprising:
code for determining a plurality of regions of interest within a captured image of a scene;
code for determining a camera motion direction towards one of the regions of interest;
code for determining a speed of motion of the camera;
code for selecting a target region of interest based on the determined camera motion direction;
code for determining a zoom speed based on the speed of camera motion and the distance from a current image frame to the target region of interest; and
code for initiating the zoom operation for the selected target region of interest in response to the camera motion before the target region of interest occupies a center area of a new image captured by the camera.

16. The system according to claim 10, further comprising the steps of:
determining a speed of motion of the camera;
determining a zoom speed based on the speed of camera motion and a distance from a current image frame to the target region of interest; and
the zooming operation being performed using the determined zoom speed.

17. The apparatus according to claim 12, further comprising:
- means for determining a speed of motion of the camera;
- means for determining a zoom speed based on the speed of camera motion and a distance from a current image frame to the target region of interest; and
- means for the zooming operation being performed using the determined zoom speed.

18. The medium according to claim 14, further comprising:
- code for determining a speed of motion of the camera;
- code for determining a zoom speed based on the speed of camera motion and a distance from a current image frame to the target region of interest; and
- code for determining the zooming operation being performed using the determined zoom speed.

* * * * *